United States Patent
Koc et al.

(10) Patent No.: US 12,499,137 B2
(45) Date of Patent: Dec. 16, 2025

(54) DYNAMIC TEXT TOKENIZATION FOR INDEX-BASED SEARCHING OF ANNOTATED DATA ASSETS USING KEYWORD-BASED TEXT SEARCHING

(71) Applicant: Amazon Technologies, Inc., Seattle, WA (US)

(72) Inventors: Ali Koc, Smithtown, NY (US); John Espenhahn, San Francisco, CA (US); Nitya Dhimantkumar Sheth, Belmont, CA (US); Rajat Mathur, Sunnyvale, CA (US); Vidit Ochani, Bothell, WA (US); Ronald Stephen Kyker, Hayward, CA (US); Amit Gul Phagwani, Fremont, CA (US); George Steven McPherson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 18/541,280

(22) Filed: Dec. 15, 2023

(65) Prior Publication Data
US 2025/0200080 A1   Jun. 19, 2025

(51) Int. Cl.
*G06F 16/31*       (2019.01)
*G06F 16/3332*   (2025.01)
(Continued)

(52) U.S. Cl.
CPC .......... *G06F 16/31* (2019.01); *G06F 16/3337* (2019.01); *G06F 40/263* (2020.01); *G06F 40/284* (2020.01)

(58) Field of Classification Search
CPC ...................................................... G06F 16/31
(Continued)

(56) References Cited

U.S. PATENT DOCUMENTS 11,475,209 B2 * 10/2022 Gelosi .................. G06F 16/31
2007/0288230 A1 * 12/2007 Datta ................... G06F 40/126
707/E17.073

(Continued)

OTHER PUBLICATIONS

N. Gerasimov, M. Mozgovoy and A. Lagunov, "Semantic sentence structure search engine," 2014 Federated Conference on Computer Science and Information Systems, Warsaw, Poland, 2014, pp. 255-259, doi: 10.15439/2014F343. keywords: {Semantics; Search engines;Indexes;Resource description framework;HTML;Ency (Year: 2014).*

*Primary Examiner* — Bharatkumar S Shah
(74) *Attorney, Agent, or Firm* — Eversheds Sutherland (US) LLP

(57) ABSTRACT

Devices, systems, and methods for tokenizing search attributes and terms of a search query for an index-based search. A method may include receiving, by a search service of a provider network, a first search query to search a first searchable document set, the first search query including a first search term in a first language; applying a first tokenization rule to identify the first search term in the first search query; determining that the first search term is in the first language; applying a second tokenization rule to tokenize the first search term based on the first search term being in the first language; causing a launch of a search instance by a managed compute service of the provider network, the search instance to execute a search function for a keyword-based text search using the tokenized first search term.

20 Claims, 13 Drawing Sheets

(51) Int. Cl.
*G06F 40/263* (2020.01)
*G06F 40/284* (2020.01)

(58) Field of Classification Search
USPC ............................................................ 704/9
See application file for complete search history.

(56) References Cited

U.S. PATENT DOCUMENTS

| | | | | |
|---|---|---|---|---|
| 2013/0013288 | A1* | 1/2013 | Elbaz | G06F 40/284 |
| | | | | 704/8 |
| 2016/0378828 | A1* | 12/2016 | Hopcroft | G06F 16/2272 |
| | | | | 707/718 |
| 2019/0370392 | A1* | 12/2019 | Cazin | G06F 16/334 |
| 2021/0157975 | A1* | 5/2021 | Gelosi | G06F 40/166 |
| 2023/0376682 | A1* | 11/2023 | Nishimura | G06F 40/205 |
| 2024/0119076 | A1* | 4/2024 | Obbard | G06F 40/263 |

* cited by examiner

DYNAMIC TEXT TOKENIZATION FOR INDEX-BASED SEARCHING OF ANNOTATED DATA ASSETS USING KEYWORD-BASED TEXT SEARCHING

BACKGROUND

Some searches and machine learning systems rely on text tokenization. For a given language, specific tokenization techniques may be applied to the text. However, the selection and application of tokenization rules require knowing the language of the text being tokenized.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
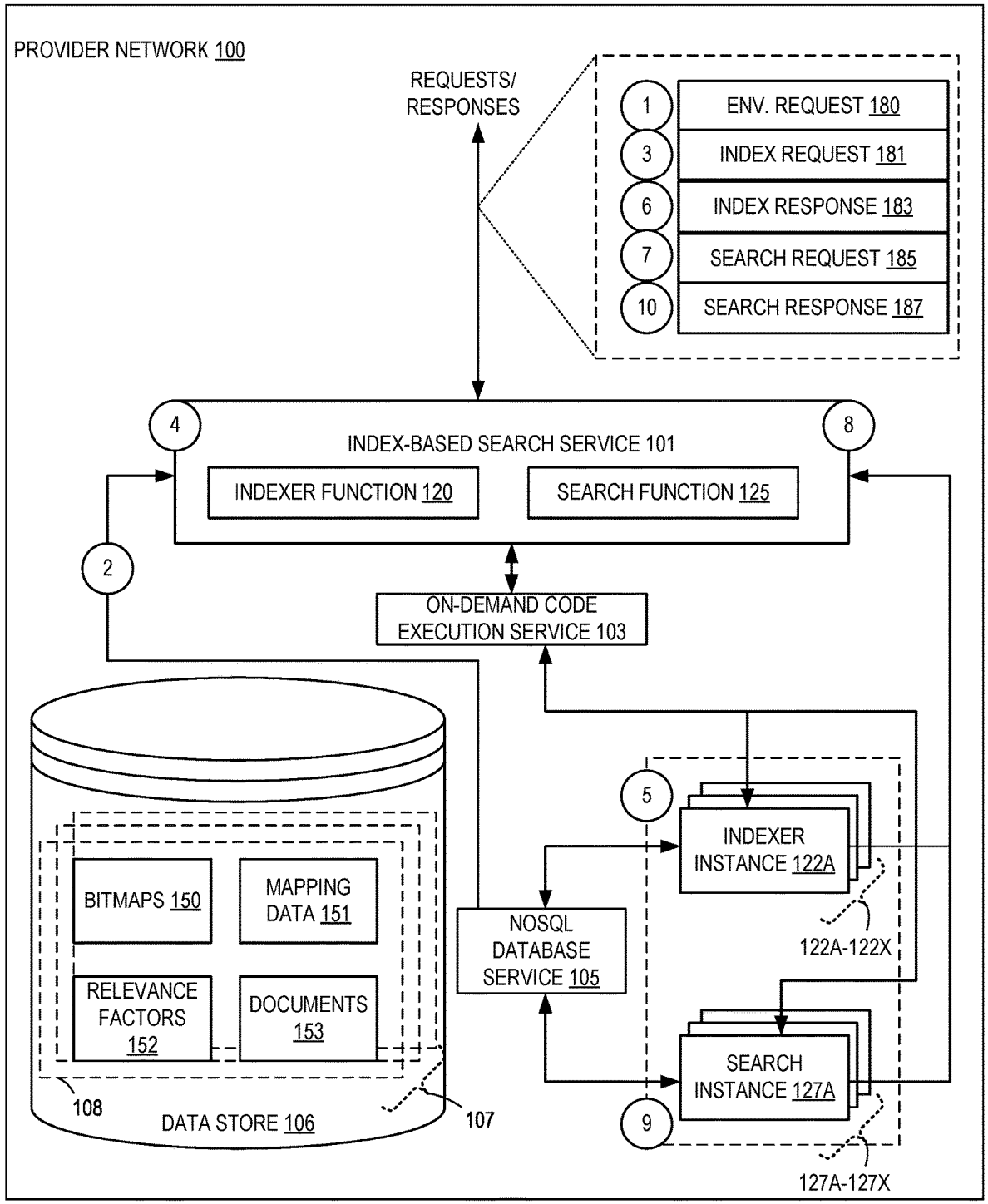
FIG. 1 illustrates an example environment for an index-based search service in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for dynamic text tokenization for index-based search engines for annotated data assets using keyword-based text searching.

Text tokenization refers to the process of splitting text into a representative set of ordered terms. The tokenization process may include a set of transformations applied to the text (and its extracted terms). Some of the transformations are generic (e.g., split at punctuation) and may be applied to text in any language (e.g., convert character to lower case). However, there are language-specific transformation, such as stemming or word segmentation, whose application requires knowledge of the language of the text.

Traditionally, the text and its language are provided so that language-specific tokenization techniques may be applied to the text. However, in the case of data management services that may catalog, discover, govern, and share computer resources of varying data types across cloud computing environments, on-premises, and at third-party sources, the language of the text being analyzed may be unknown. For example, when a user uses an index-based search engine to search for data across multiple resources (e.g., annotated data assets, such as asset titles, descriptions, etc. for the data assets) by inputting search text, the language of the search text may be unknown to the service. In addition, the text input to the an index-based search engine may be in multiple languages. For example, search string of "カタログセールス (catalog_sales)" may represent a title of a data asset identifiable to the index-based search engine and including both Japanese and English. This technical challenge does not exist when a language is set or selected in a web browser, for example, when inputting a search query. In contrast, the searching herein may refer to a keyword-based text search using the search tokens (e.g., in contrast with a vector-based search using cosine similarity, etc.).

The search function of the index-based search engine may support searching for terms in documents as well as other features, such as filtering documents based on terms, searching for documents based on search terms found referenced documents, aggregating documents based on search terms, and projecting values from referenced documents into search results. The index-based search service can also support different environments for customers. Different environments are typically secured from one another, and different cloud computing customers can use environments to create searchable document sets that are inaccessible to one another.

The search function of the service may receive a search request including one or more parameters, one or more "searchtext" attributes, and one or more terms in one or more languages unknown and not provided to the search function. One exemplary parameter is an identification of the environment in which to search for documents. Another exemplary parameter is a search query, which can be described in a structured form such as JSON. The search function may tokenize the terms into multiple search text tokens using tokenization rules, some of which may be global (e.g., applying to any language), and some of which may be language-specific. Without knowing the one or more languages in the search request and/or in the asset (e.g., different attributes of a JSON document), the search function may not apply the correct tokenization rules, which may result in fewer and/or less accurate search results than the enhanced techniques herein. For example, in the "カタログセールス (catalog_sales)" example, if only the English tokenization rules or only the Japanese tokenization rules are applied, then the search results may not account for the terms in the other language and/or may return some irrelevant results.

In one or more embodiments, a first pass of tokenization at the attribute level may determine the language of the attribute. A first pass of tokenization at the term level may determine the language of individual terms of a given attribute. The distinction between attributes and terms is further described herein.

In one or more embodiments, the index-based search engine be part of an index-based service that may operate as a search backend for a frontend service or application. One such frontend service is a business data cataloging service that allows cloud customers to annotate their data to discover, share, and track data across their organization. Such a service can be populated from a variety of data sources such as database tables, spreadsheets, dashboards, streaming solutions, data pipelines, IoT (Internet of Things) devices, ML (machine learning) models, images, videos and more. The frontend service or application would compose document indexing and search requests and submit them to the index-based search engine.

Documents are generally composed of attributes (sometimes referred to as "annotated documents"). Such documents are typically represented using a structured file format. One such file format is JavaScript Object Notation (JSON). Documents might originate from the Internet (e.g., websites with URLs, author information, etc.), from cloud-based applications or services (e.g., a customer support application that generates documents including attributes such as customer identifier, product identifier, date, complaint, etc.), or from various other applications of an individual or business (e.g., in word processing application with metadata indicating the author, date edited, company, version, etc.).

In some examples, attributes can be broken down into at least two groups: reserved attributes and non-reserved attributes. Reserved attributes typically are attributes that are used to provide information about the documents whereas non-reserved attributes typically are attributes against which search queries are evaluated.

In one or more embodiments, the search function of the index-based search engine may perform complex search queries of annotated data assets accessible in or via a cloud-based environment using indexer-generated indexes and typically without using the underlying documents by using tokenization. Tokens may include "term"-type attributes and "value"-type attributes.

In some examples, a document may have a reserved "document identifier" attribute that uniquely identifies the document in the set of documents that are indexed for search. In some examples, the index-based search engine may expect a default attribute name to serve as the document identifier attribute (e.g., an attribute with the name "ID" might be the default document identifier attribute). In other examples, the caller that submits indexing requests to the index-based search engine can include with the request an indication of the attribute in the documents that represents the document identifier (e.g., to use "DOCID" attribute name rather than the default "ID" attribute name). In yet other examples, documents submitted for indexing may not have a unique document identifier assigned. In such a case, an indexer function of the service can assign a unique document identifier to any document and return those identifiers to the caller.

In some examples, each document has a reserved "document type" attribute. The document type attribute serves as a top level classifier of the documents being indexed for search. In some examples, the index-based service may expect a default attribute name to serve as the document type attribute (e.g., an attribute with the name "ENTITY" might be the default document type attribute). In other examples, the caller that submits indexing requests to the index-based service can include with the request an indication of the attribute in the documents that represents the document type (e.g., to use "DOCTYPE" attribute name rather than the default "ENTITY" attribute name).

To provide one real-world example, a document corpus might consist of written works gathered from various media. The document type of each document can indicate its source (e.g., book, journal article, blog post, website, magazine article, book, etc.). The documents can have various other attributes such as a date of publication, summary, full-text (that includes the full text of the document), author, etc. Different document types may have certain common attributes and other different attributes (e.g., a URL attribute would be more applicable to a website than to a book while an author attribute would be applicable to both).

In some examples, other reserved attributes may exist within documents. Like the document identifier and document type attributes, other reserved attributes may have default names or be otherwise identified in an indexing request. Exemplary other reserved attributes include "parent" and/or "child" attributes (e.g., to identify relationships between documents).

In some examples, document attributes can be of different types. Two exemplary types are "term"-type attributes and "value"-type attributes. The index-based service indexes term-type attributes via tokenization (e.g., breaking the corresponding attribute text value into words) and indexes value-type attributes in their entirety (e.g., without tokenization). For example, an attribute having a value "Project Red" indexed as a term-type attribute would be separately associated with the terms "Project" and "Red," while the same attribute value indexed as a value-type attribute would be associated with the value "Project Red." Value-type attributes are useful for attributes that have been enumerated in a known set (e.g., animal species, vehicle manufacturers). Some value-type attributes might be referred to as "picklist" attributes where a user sets the attribute by "picking" from a predefined set of values. Value-type attributes can contain, for example, a document identity of another document related to the document in which the value-type attribute appears. Note that reserved attributes are typically value-type attributes.

The attribute type can be indicated as part of an indexing request. For example, the caller submitting indexing requests to the index-based service can include with the indexing configuration an identification of the attribute names to treat as value-type and/or term-type. As another example, the caller that submits indexing requests can signal via an indicator in the attribute names whether attributes are either term- or value-type. For example, term-type attributes may be prefixed with an underscore "_publicationDate" whereas value-type attributes may be identified based on the absence of the term-type indicator (or vice versa, of course).

In some examples, documents are indexed via bitmaps. Bitmaps are bit-based objects for a given attribute term or value that indicate, for each bit position in the bitmap, whether the attribute term or value is present in the document associated with that bit position. The presence of a "set" bit (typically a "1") indicates that the term is present in the corresponding document. Conversely, the presence of a "cleared" bit (typically a "0") indicates that the term is not present in the corresponding document. To illustrate, consider the following two example documents:

| Example Documents |
| --- |
| { "entity":"animal", "id":"animal-1", "name":"blue bird" } |
| { "entity":"animal", "id":"animal-2", "name":"red bird" } |

In the NoSQL database, bitmaps can be indexed under a key that is based at least in part on the term, such as an attribute-term combination or a document type-attribute-term combination. Under such a scheme, the bitmaps for the above two documents would be stored in a database table as values as follows (shown without any bitmap compression):

| Key | | | Value |
| --- | --- | --- | --- |
| Entity | Attribute | Term | (bitmap) |
| animal | name | blue | 10 |
| animal | name | bird | 11 |
| animal | name | red | 01 |

Mapping data relates bitmap position indices to document identifiers. Mapping data can include forward mappings (bitmap index→document identifier) and reverse mappings (document identifier→bitmap index). In the NoSQL context, forward mappings can be stored in a table having a key that is the bitmap index and a value that is the corresponding document identifier, and reverse mappings can be stored in a table having a key that is the document identifier and a value that is the corresponding bitmap index. With reference to the above two example documents, the corresponding mapping data would be:

| Forward Mapping Data | | Reverse Mapping Data | |
| --- | --- | --- | --- |
| Key | Value | Key | Value |
| 0 | Animal-1 | Animal-1 | 0 |
| 1 | Animal-2 | Animal-2 | 1 |

Continuing to use the above example two documents, a search instance configured to find the documents that contain the terms blue and bird in the name would load the bitmaps for those terms (e.g., animal-name-blue and animal-name-bird) and perform a bitwise AND operation to determine that the "animal-1" document matches the query (e.g., 10 AND 11=10; bit position 0 is set and corresponds to the "animal-1" document).

In some examples, the various items in a searchable document data set such as set 108 are stored in tables supporting multiple environments rather than in separate databases. In such a case, the key-value store may have a key that is further based on the environment of the document set. Extending the above bitmap example, such a table might look like the following:

| Key | | | | Value |
| --- | --- | --- | --- | --- |
| Environment | Entity | Attribute | Term | (bitmap) |
| env123 | animal | name | blue | 10 |
| env123 | animal | name | bird | 11 |
| env123 | animal | name | red | 01 |

In such cases, the CreateEnvironment and DeleteEnvironment API calls can operate on entries in the tables rather than upon separate databases. Likewise, indexing and search requests would read or write data based on keys that include the environment identifier. Additionally, one or more fields in an entry are typically encrypted with the caller-specified key for the environment.

In one or more embodiments, because the search request language is unknown to the service, the service may apply tokenization rules incrementally and dynamically. For any asset, the service may tokenize the value of each term using a multi-pass approach. Using the "カタログセールス (catalog_sales)" example, the service may perform universal (global) tokenization rules to split the text into terms: [カタログセールス, catalog, sales]. The service then may perform language detection on each term independently and assign a language based on a confidence level that the term is in a particular language (e.g., confidence >0.8 or another threshold): [カタログセールス: Japanese, catalog: English, sales: English]. When a confidence level is below the threshold, the term or attribute may be excluded from the application of a language-specific tokenization rule and from use in the search. As a result, each search term may be assessed for its language. When the language is detected with sufficient confidence, the service may apply the language-specific tokenization rules to each term. For example, an English-specific rule may apply stemming so that "sales" becomes "sale." A Japanese-specific rule may include morphological analysis to split カタログセールス into two terms: "カタログ" meaning catalog, and "セールス" meaning sales. Then, the service may perform the search (e.g., keyword-based text search).

In one or more embodiments, the search query may include a "searchin" attribute that identifies one or more document-type attribute combinations in which to search for the search text tokens. Each combination can include a "termmatchingmethod" which may support different matching techniques such as "exact" for a search text token that matches a full indexed term, "begins_with" for a search text token that matches the beginning of an indexed term, "contains" for an indexed term that contain the search text token, etc. Each combination can also include a "rankmultiplier" to scale the relevance factor(s) of the documents identified within that combination. In an example search query, the search is looking for terms that contain the searchtext in an attribute provided in the search query. In some examples, the search function may adjust the rank-multipler for stop words (e.g., by dividing the rank multiplier by a factor such as 2).

The search query may include a "filters" attribute that identifies one or more document-type attribute combinations that have a value matching the "value." Such filters are typically performed on value-type attributes.

In one or more embodiments, a search instance may process the search query to identify the implicated bitmaps and relevance factors and load them from the searchable document set. The search instance would retrieve the bitmap for each search term token for each document type-attribute combination(s) in "searchin." Here, there is only one search term token and only one searchin combination, so the search instance would load the bitmap and relevance factors corresponding to the class-description-blooded key. Additionally, the search instance would retrieve the bitmap associated with the filter(s).

In one or more embodiments, the search instance performs bitwise operations to identify the documents that match the search query. The search instance scores the documents that match the searchtext, searchin, and filters. In one example, the search instance calculates the score by multiplying the rank included with the search query by a scaled relevance factor. For example, if the relevance factor was an 8-bit unsigned value based on the combination of term count and position, the search instance could scale the relevance factor by dividing it by 128 thereby boosting certain documents (with a value over 1) and penalizing others (with a value less than 1).

In one or more embodiments, the search instance may compile a result identifying and possibly including the documents that passed the search and filter operations, typically sorting the result by score. The search instance retrieves the document identifiers associated with the set bit positions in the bitmap resulting from the search and filter operations from the mapping data. In some examples, the search instance compiles a result having each of the document identifiers and their associated score without including the underlying documents. In other examples, the search instance includes the resulting documents in the result by retrieving them the documents based on the document identifiers retrieved from the mapping data.

Technical benefits of the enhanced tokenization techniques herein allow for improved recognition of search term languages and search attributes to use in computer searches, and improved relevance of search results because of the improved tokenization. Additional technical benefits include allowing for multi-language searches in which a search request includes terms and attributes in multiple languages, and provides search results based on the searches in the multiple languages rather than a search result in only one language used in the search request.

The above descriptions are for purposes of illustration and are not meant to be limiting. Numerous other examples, configurations, processes, etc., may exist, some of which are described in greater detail below. Example embodiments will now be described with reference to the accompanying figures.

ILLUSTRATIVE PROCESSES AND USE CASES

FIG. 1 illustrates an example environment for an index-based search service in accordance with one or more embodiments of the present disclosure.

Referring to FIG. 1, A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, a hardware virtualization service, a container service, an on-demand code execution service, or the like.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one micro VM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

An on-demand code execution service (OCES) 103 (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service 103 by uploading their code and use one or more APIs to request that the OCES 103 identify, provision, and manage any resources required to run the code. Thus, in various examples, a "serverless" function can include code provided by a user or other entity—such as the provider network itself—that can be executed on demand. Serverless functions can be maintained within the provider network by an OCES 103 and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

An index-based search service (ISS) 101 creates and manages indexes through which documents can be searched and, using those indexes, executes search queries. The ISS 101 vends an API via which a caller (sometimes referred to as a "requestor") can issue requests to the ISS 101 to perform various operations related to the indexing and search of documents. Exemplary API calls that the ISS 101 can vend include:

| API Call | Method | Mutating | Functionality |
|---|---|---|---|
| CreateEnvironment | POST | Mutating | Creates searchable documents environment |
| Index | POST | Mutating | Submits data for indexing in an environment |
| Search | POST | Non-mutating | Executes search query against environment |
| Delete | POST | Mutating | Deletes documents within an environment |
| DeleteEnvironment | DELETE | Mutating | Deletes a searchable document environment |

Various operations of the ISS 101 are described with reference to the circled numbers of FIG. 1. Note that the operations may be described using the term "request" which typically refers to an API call.

A typical deployment of the ISS 101 would be as a search backend for a frontend service or application. One such frontend service is a business data cataloging service that allows cloud customers to annotate their data to discover, share, and track data across their organization. Such a service can be populated from a variety of data sources such as database tables, spreadsheets, dashboards, streaming solutions, data pipelines, IoT devices, ML models, images, videos and more. The frontend service or application would compose document indexing and search requests and submit them to the ISS 101.

Documents are generally composed of attributes (sometimes referred to as "annotated documents"). Such documents are typically represented using a structured file format. One such file format is JavaScript Object Notation (JSON). Documents might originate from the Internet (e.g., websites with URLs, author information, etc.), from cloud-based applications or services (e.g., a customer support application that generates documents including attributes such as customer identifier, product identifier, date, complaint, etc.), or from various other applications of an individual or business (e.g., in word processing application with metadata indicating the author, date edited, company, version, etc.).

In some examples, attributes can be broken down into at least two groups: reserved attributes and non-reserved attributes. Reserved attributes typically are attributes that are used to provide information about the documents whereas non-reserved attributes typically are attributes against which search queries are evaluated.

In some examples, each document has a reserved "document identifier" attribute that uniquely identifies the document in the set of documents that are indexed for search. In some examples, the ISS 101 may expect a default attribute name to serve as the document identifier attribute (e.g., an attribute with the name "ID" might be the default document identifier attribute). In other examples, the caller that submits indexing requests to the ISS 101 can include with the request an indication of the attribute in the documents that represents the document identifier (e.g., to use "DOCID" attribute name rather than the default "ID" attribute name). In yet other examples, documents submitted for indexing may not have a unique document identifier assigned. In such a case, the indexer function 120 can assign a unique document identifier to each document and return those identifiers to the caller.

In some examples, each document has a reserved "document type" attribute. The document type attribute serves as a top level classifier of the documents being indexed for search. In some examples, the ISS 101 may expect a default attribute name to serve as the document type attribute (e.g., an attribute with the name "ENTITY" might be the default document type attribute). In other examples, the caller that submits indexing requests to the ISS 101 can include with the request an indication of the attribute in the documents that represents the document type (e.g., to use "DOCTYPE" attribute name rather than the default "ENTITY" attribute name).

Figure 2:
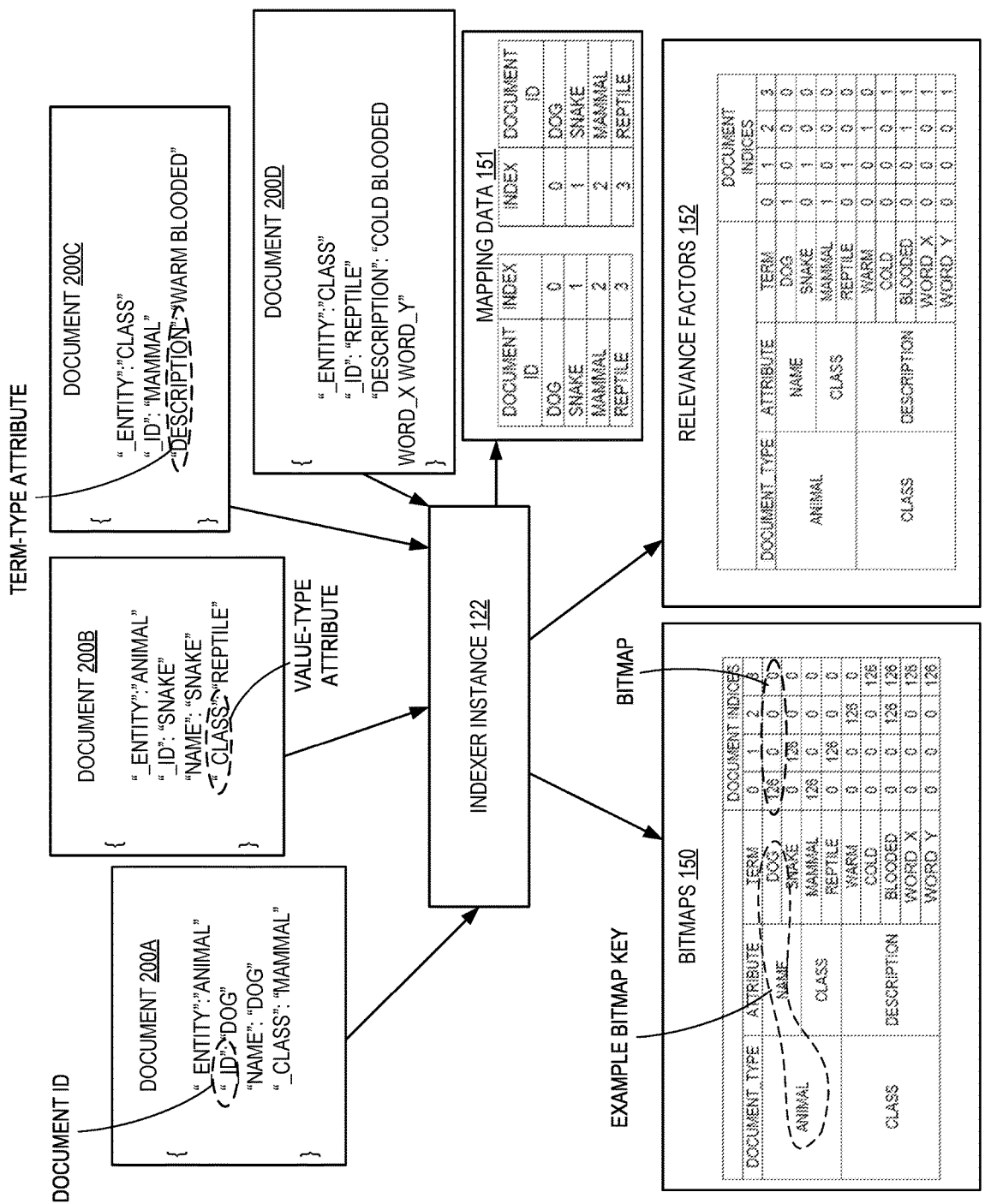
FIG. 2 illustrates example indexing operations of the index-based search service of FIG. 1 in accordance with one or more embodiments of the present disclosure.

To provide one real-world example, a document corpus might consist of written works gathered from various media. The document type of each document can indicate its source (e.g., book, journal article, blog post, website, magazine article, book, etc.). The documents can have various other attributes such as a date of publication, summary, full-text (that includes the full text of the document), author, etc. Different document types may have certain common attributes and other different attributes (e.g., a URL attribute would be more applicable to a website than to a book while an author attribute would be applicable to both). A set of exemplary documents is illustrated in FIG. 2.

In some examples, other reserved attributes may exist within documents. Like the document identifier and document type attributes, other reserved attributes may have default names or be otherwise identified in an indexing request. Exemplary other reserved attributes include "parent" and/or "child" attributes (e.g., to identify relationships between documents).

In some examples, document attributes can be of different types. Two exemplary types are "term"-type attributes and "value"-type attributes. The ISS 101 indexes term-type attributes via tokenization (e.g., breaking the corresponding attribute text value into words) and indexes value-type attributes in their entirety (e.g., without tokenization). For example, an attribute having a value "Project Red" indexed as a term-type attribute would be separately associated with the terms "Project" and "Red," while the same attribute value indexed as a value-type attribute would be associated with the value "Project Red." Value-type attributes are useful for attributes that have been enumerated in a known set (e.g., animal species, vehicle manufacturers). Some value-type attributes might be referred to as "pick-list" attributes where a user sets the attribute by "picking" from a predefined set of values. Value-type attributes can contain, for example, a document identity of another document related to the document in which the value-type attribute appears. Note that reserved attributes are typically value-type attributes.

The attribute type can be indicated as part of an indexing request. For example, the caller submitting indexing requests to the ISS 101 can include with the indexing configuration an identification of the attribute names to treat as value-type and/or term-type. As another example, the caller that submits indexing requests can signal via an indicator in the attribute names whether attributes are either term- or value-type. For example, term-type attributes may be prefixed with an underscore "publicationDate" whereas value-type attributes may be identified based on the absence of the term-type indicator (or vice versa, of course).

The compute and storage infrastructure of the provider network 100 supporting the ISS 101 can take on a variety of forms. In the illustrated example, the compute backing (e.g., for performing indexing and search operations, sometimes referred to as a "capacity") is provided by the OCES 103 and the storage backing is provided by a NoSQL database service 105 that provides virtualized databases. The NoSQL database service 105 can vend an API through which other entities (e.g., an indexer instance or a search instance) can store and retrieve data from a database. An exemplary NoSQL database is a key-value database where values are stored under unique key names. Other compute backings are viable and include virtual machines launched via the hardware virtualization service and containers launched via the container service. Other storage backings are viable and include object stores, SQL databases, block-based storage, etc. In some examples, multiple storage backings can be used based on different levels of performance (see, for example, FIG. 7 and the associated description).

In examples leveraging the OCES 103 as compute capacity, the ISS 101 launches function "instances" via the OCES 103. Such instances execute on OCES resources using containers, virtual machines, etc. More generally, the ISS 101 can cause the launch of the function instances by submitting launch requests to the managed compute service providing the compute backing for the ISS 101. Two exemplary functions are the indexer function 120 and the search function 125. The functions 120, 125 are authored in a language executable within a function instance environment. Exemplary languages include Java, Go, PowerShell, Node.js, C#, Python, and Ruby code. The functions are typically generic—the same indexer function 120 can be launched as many different indexer instances 122A-X via the OCES 103 to perform different indexer operations to service different indexing requests; the same search function 125 can be launched as many different search instances 127A-Y via the OCES 103 to perform different search queries to service different search requests. Environment variables (sometimes referred to as external or configuration variables) included as part of a request to the OCES 103 to execute a function can be used to change the behavior of a function. The function can be programmed to access these environment variables at runtime. Such variables typically relay the various request parameters received with an index request or a search request to the launched instance as described below.

In some examples, the ISS 101 supports concurrent requests from callers (i.e., requests are non-blocking). Upon receiving an indexing request or search request, the ISS 101 can initiate the launch of an instance to execute the corresponding function. The instance executes while the ISS 101 launches other instances to service other requests and responds to other outstanding requests. As a result, disclosed examples provide for concurrent search and indexing operations to multiple environments of multiple customers.

When the ISS 101 launches an instance via the OCES 103, it can assign (e.g., as a configuration variable) or receive an identifier of the instance from the OCES 103 that identifies the instance. The ISS 101 can associate that instance identifier with a request identifier in request tracking data (not shown). In some examples, the tracking data can store, for a received request, an assigned request identifier, any parameters included with the request, and an identification of the caller. When the function completes, the function can return a response to the ISS 101, the response including the instance identifier. Using the instance identifier and the request tracking data, the ISS 101 can identify the original request and issue a response to the caller.

The CreateEnvironment and DeleteEnvironment requests (or API calls) can be used to create and delete environments 107 within the storage backing that can be used to store searchable document sets 108. Environments 107 (not to be confused with environment variables passed to indexer and search instances) allow the ISS 101 to serve multiple tenants-different callers create different environments (and, of course the same caller can create many environments for many different document sets).

In some examples, at least a portion of an environment is encrypted using a caller-specified encryption key. When issuing a CreateEnvironment request, the caller can include an encryption key with the request configuration that the ISS 101 will use for encryption operations to secure the data in the storage backing (e.g., provided by the database service 105 or other storage service of the provider network 100). The ISS 101 may maintain the encryption key for subsequent use in other authenticated requests from the same caller or discard the encryption key after a request is fulfilled and instead rely on the caller to include it with subsequent indexing or search requests.

As indicated at circle 1, a caller can issue an environment request 180 to the ISS 101 (e.g., a CreateEnvironment or DeleteEnvironment request). Upon receiving a CreateEnvironment request, the ISS 101 can create a new storage backing for the searchable document set in the storage capacity backing the ISS 101. In the illustrated example, the ISS 101 creates a new database with the database service 105 as indicated at circle 2. The database service 105 creates a new database and assigns it an identifier that is returned to the ISS 101. The ISS 101 can return the database identifier or another indication thereof to the CreateEnvironment caller (not shown) so that the caller can use that identifier to reference the created environment for subsequent indexing and search requests. Additionally, a caller can use the database identifier or indication thereof when issuing a DeleteEnvironment request. Upon receiving a DeleteEnvironment request (circle 1), the ISS 101 can delete the storage backing (e.g., the database) for the document set (circle 2) via the database service 105.

An environment with an example searchable document data set 108 is shown. The searchable document data set 108 includes bitmaps 150, mapping data 151, relevance factors 152 (described in more detail with reference to FIG. 2), and documents 153. In the NoSQL database context, each of these items can be a key-value table.

In some examples, documents are indexed via bitmaps 150. As the name suggests, bitmaps 150 are bit-based objects for a given attribute term or value that indicate, for each bit position in the bitmap, whether the attribute term or value is present in the document associated with that bit position. The presence of a "set" bit (typically a "1") indicates that the term is present in the corresponding document. Conversely, the presence of a "cleared" bit (typically a "0") indicates that the term is not present in the corresponding document. To illustrate, consider the following two example documents:

| Example Documents |
| --- |
| { "entity":"animal", "id":"animal-1", "name":"blue bird" } |
| { "entity":"animal", "id":"animal-2", "name":"red bird" } |

In the NoSQL database, bitmaps can be indexed under a key that is based at least in part on the term, such as an attribute-term combination or a document type-attribute-term combination. Under such a scheme, the bitmaps for the above two documents would be stored in a database table as values as follows (shown without any bitmap compression):

| Key | | | Value |
| --- | --- | --- | --- |
| Entity | Attribute | Term | (bitmap) |
| animal | name | blue | 10 |
| animal | name | bird | 11 |
| animal | name | red | 01 |

Since each bit corresponds to a document, the size of an uncompressed bitmaps is equal to the number of documents in a set. In these example bitmaps, the first bit (bitmap index 0) corresponds to the document with the document identifier "animal-1" and the second bit (bitmap index 1) corresponds to the document with the document identifier "animal-2." The first bitmap (animal-name-blue) indicates that the first document's name attribute contains the term "blue" (bit position 0 is a "1") and the second document's name attribute does not contain the term "blue" (bit position 1 is a "0").

Mapping data 151 relates bitmap position indices to document identifiers. Mapping data 151 can include forward mappings (bitmap index→document identifier) and reverse mappings (document identifier→bitmap index). In the NoSQL context, forward mappings can be stored in a table having a key that is the bitmap index and a value that is the corresponding document identifier, and reverse mappings can be stored in a table having a key that is the document identifier and a value that is the corresponding bitmap index. With reference to the above two example documents, the corresponding mapping data 151 would be:

| Forward Mapping Data | | Reverse Mapping Data | |
| --- | --- | --- | --- |
| Key | Value | Key | Value |
| 0 | Animal-1 | Animal-1 | 0 |
| 1 | Animal-2 | Animal-2 | 1 |

Continuing to use the above example two documents, a search instance configured to find the documents that contain the terms blue and bird in the name would load the bitmaps for those terms (e.g., animal-name-blue and animal-name-bird) and perform a bitwise AND operation to determine that the "animal-1" document matches the query (e.g., 10 AND 11=10; bit position 0 is set and corresponds to the "animal-1" document).

The number of bitmaps in such a system is approximately N×M×K where N is the number of entities (or document types) in the system, M is the average number of attributes for each entity, and K is the average number of distinct terms that appear per attribute. Bitmaps 150 can be compressed and bitmap operations can be performed using an algorithm such as Roaring Bitmaps (https://roaringbitmap.org/).

In some examples, the document data set 108 further includes a set of bitmap indices that are available due to document deletion requests. When a document is deleted from the document data set 108, the corresponding bit position for the deleted document in the bitmaps 150 can be cleared, the mappings between the bit position and document identifier in the mapping data 151 can be cleared, the relevance factors for the deleted document in the relevance factors 152 can be set to cleared, and the document can be deleted from the documents 153. The documents previously assigned bitmap index can then be added to the set of available bitmap indices.

The available bitmap indices can be re-used for new document additions to avoid re-indexing the existing indexed documents with new bit positions and to avoid increasing the bitmap size. When a new document is identified for indexing, the indexer function 120 can first check whether there is an available bitmap position in the available bitmap indices. If one exists, the indexer function 120 can assign that bitmap position to the new document and remove it from the set of available bitmap indices. If none exists, the indexer function 120 can increase the size of the bitmaps by one with the new bit position corresponding to the new document.

In some examples, the various items in a searchable document data set such as set 108 are stored in tables supporting multiple environments rather than in separate databases. In such a case, the key-value store may have a key that is further based on the environment of the document set. Extending the above bitmap example, such a table might look like the following:

| Key | | | | Value |
| --- | --- | --- | --- | --- |
| Environment | Entity | Attribute | Term | (bitmap) |
| env123 | animal | name | blue | 10 |
| env123 | animal | name | bird | 11 |
| env123 | animal | name | red | 01 |

In such cases, the CreateEnvironment and DeleteEnvironment API calls can operate on entries in the tables rather than upon separate databases. Likewise, indexing and search requests would read or write data based on keys that include the environment identifier. Additionally, one or more fields in an entry are typically encrypted with the caller-specified key for the environment.

At a high level, the indexer function 120 generates bitmaps from incoming documents. An exemplary indexing flow is described with reference to circles 3-6. Additional details of the various operations that can be provided by the indexer function 120 are provided with reference to FIG. 2. At circle 3, the ISS 101 receives an indexing request 181, the request 181 including one or more parameters. One exemplary parameter is an identification of the environment in which to index documents. Another exemplary parameter is the documents to be indexed and/or location(s) of documents to be indexed (e.g., if stored in another data store of the provider network 100). Another exemplary parameter is one or more indications of any reserved-type attribute names (if other than a default). Such reserved type attributes include the document type attribute, the document identifier attribute, the parent attribute, the child attribute, etc. Another exemplary parameter is an indication of any value-type and/or term-type attributes. Such an indication may be a character or other sequence used to prefix or suffix attributes of a particular type (e.g., a leading '_' indicates a value-type, a trailing '$' indicates a value-type, etc.).

At circle 4, the ISS 101 processes the request. Processing the request can include preparing the environment variables for an indexer function 120 based on the parameters included in the request 181 such as the environment into which to index documents, the documents to index (or delete) or a location of the documents, indications of reserved-type attributes, indications of value-type and/or term type attributes, an instance identifier, etc. The ISS 101 requests the launch of a serverless instance to execute the indexer function 120 (referred to here as an "indexer instance"), the launch request including the indexer function 120 or a location thereof and the environment variables or a location thereof. The ISS 101 also updates request tracking data to associate an identifier of the instance with an identifier of the request received at circle 3. Again, ISS 101 may assign and pass along an identifier as an environment variable or receive an identifier from the OCE 103 in response to the launch request.

At circle 5, the launched indexer instance 122A executes the indexer function 120 as configured by the environment variables. The indexer instance 122A generates and stores searchable document set data 108 in the identified environment in the data store 106. The indexer instance 122A generates bitmaps 150. As indicated above, the indexer instance 122A can store generated bitmaps 150 in a key-value store table under keys that are based at least in part on the indexed term, such as an attribute-term combination or a document type-attribute-term combination. The indexer instance 122A generates mapping data 151. The indexer instance 122A can store forward and reverse mapping data 151 in a table as indicated above (respectively keyed by bit position and document identifier). The indexer instance 122A generates relevance factors 152 (described in more detail with reference to FIG. 2). The indexer instance 122A can store generated relevance factors 152 in a key-value store table in a manner similar to the keying scheme for the bitmaps 150. The indexer instance 122A can also store indexed documents in the data store 106. The indexer instance 122A can store documents as values in a table indexed by document identifier. In some examples the documents are stored in compressed form.

Other indexing-type requests are possible and can be supported by the ISS 101 and indexer function 120. The ISS 101 may support an indexing request that includes or identifies a document with an already indexed document identifier in an environment. The ISS 101 treats such a request as a reindexing request. Exemplary operations associated with a reindexing request for a document in the environment with searchable document set 108 would entail, by an indexer instance launched to service the reindexing request, identifying the corresponding bit position based on the document identifier using the reverse mapping data, clearing the identified bit positions from the bitmaps, clearing the relevance factors associated with the document from relevance factors 152, and deleting the document from documents 153. The indexer instance would then re-index the document by identifying the terms to set in the corresponding bitmaps 150, re-calculating the associated relevance factors, and adding the new document to the documents 153.

Another type of indexing request is a delete request. The ISS 101 can receive a delete request, the request including a document identifier of an indexed document in an environment. Exemplary operations associated with a delete request for a document in the environment with searchable document set 108 would entail, by an indexer instance launched to service the delete request, identifying the corresponding bit position based on the document identifier using the reverse mapping data, clearing the identified bit positions from the bitmaps, clearing the relevance factors associated with the document from relevance factors 152, deleting the document from documents 153, clearing the entries associated with the document identifier/bit position in the mapping data 151, and adding the newly freed bitmap position index to the set of available bitmap indices.

Once the indexer instance 122A completes execution of the indexing operations, the indexer instance 122A can send a response to the ISS 101, the response including an identifier that the ISS 101 can use to determine the associated inbound request that the indexer instance 122A was servicing via the request tracking data. Based on that identification, the ISS can send an indexing response 183 to the caller that issued the request 181 to indicate that the requested indexing operations are complete as indicated at circle 6.

At a high level, the search function 125 performs bitwise operations on bitmaps to identify documents that match search queries (e.g., keyword-based text searches using search tokens). Other operations can include ranking matching documents prior to returning a result and the search referencing, aggregation, and projection features described below. An exemplary search flow is described with reference to circles 7-10. Additional details of the various operations that can be provided by the search function 125 are provided with reference to FIGS. 3-6. At circle 7, the ISS 101 receives a search request 185, the request 185 including one or more parameters. One exemplary parameter is an identification of the environment in which to search for documents. Another exemplary parameter is a search query, which can be described in a structured form such as JSON. Various example search queries are illustrated and described with reference to FIG. 3-6. The search query may include multiple attributes and/or terms in one or multiple languages unknown to the ISS 101 (e.g., not provided or otherwise signaled to the ISS 101). The attributes and/or terms in the search query may be tokenized and used for the keyword-based text searches as described herein.

At circle 8, the ISS 101 processes the request. Processing the request 185 can include preparing the environment variables for a search function 125 based on the parameters included in the request 185 such as the environment including the data to be searched, the search query, an instance identifier, etc. The ISS 101 requests the launch of a serverless instance to execute the search function 125 (referred to here as a "search instance"), the launch request including the search function 120 or a location thereof and the environment variables or a location thereof. The ISS 101 also updates request tracking data to associate an identifier of the instance with an identifier of the request received at circle 7. Again, ISS 101 may assign and pass along an identifier as an environment variable or receive an identifier from the OCE 103 in response to the launch request.

In one or more embodiments, processing the request 185 may include tokenizing search attributes and/or terms using tokenization rules, some of which may be global (e.g., applying to any language), and some of which may be language-specific. Without knowing the one or more languages in the search request and/or in the asset (e.g., different attributes of a JSON document), the search function may not apply the correct tokenization rules, which may result in fewer and/or less accurate search results than the enhanced techniques herein. For example, in the "カタログセールス (catalog_sales)" example, if only the English tokenization rules or only the Japanese tokenization rules are applied, then the search results may not account for the terms in the other language and/or may return some irrelevant results. A first pass of tokenization at the attribute level may determine the language of the attribute. A first pass of tokenization at the term level may determine the language of individual terms of a given attribute.

At circle 9, the launched search instance 127A executes the search function 125 as configured by the environment variables. The search instance 127A evaluates the query. Depending on the query and its identified tokens, query evaluation can involve one or more rounds of identifying entries in bitmaps 150, entries in mapping data 151, and/or entries in relevance factors 152 to load from the identified environment in the data store 106 and evaluation of those loaded values. Typically, the search instance executes the entire query without accessing the documents 153. The search instance 127A generates the search result, which can include data that resulted from the query such as the identified documents from documents 153 or references to the identified documents in documents 153.

Once the search instance 127A completes execution of the search operations and has generated the search result, the search instance 127A can send a response to the ISS 101, the response including the search result and an identifier that the ISS 101 can use to determine the associated inbound request that the search instance 127A was servicing via the request tracking data. Based on that identification, the ISS can send the search response 187 to the caller that issued the request 181 to provide the search results as indicated at circle 10.

In some examples, the ISS 101 can check whether a request 180, 181, 185 targets the same environment as a pending indexing operation identified in the request tracking data. In such a case, the ISS 101 can return a response to the newer request indicating that it should be tried again later.

FIG. 2 illustrates example indexing operations of the index-based search service of FIG. 1 in accordance with one or more embodiments of the present disclosure.

Referring to FIG. 2, the index function 120 processes documents to generate indexes used for search operations. An example set of documents 200A-200D are illustrated.

Each document has a unique document identifier (e.g., document 200A has "_ID":"DOG" while document 200C has "_ID":"MAMMAL"). Each document also has a document type (e.g., document 200A has "_ENTITY":"ANIMAL," document 200D has "_ENTITY":"CLASS."). The attributes in each document also have an indication as to whether they are term-type or value-type (e.g., the '_' prefix).

During indexing operations, the indexer instance 122 (executing the index function 120) can create or update searchable document set data in the specified environment (not shown). Documents can be processed in any order and may be processed in parallel groups by later combining the resulting bitmaps from each group. Processing document 200C, for example, the indexer instance 122 would assign a bitmap index to the document and update mapping data 151. The bitmap index for a document being added may be assigned from a set of available bitmap indices (e.g., due to deletion operations) or by assigning the next available bitmap. In this example, the indexer instance 122 assigns bitmap index 2 to document 200C (having the document identifier "mammal"). A non-reserved attribute in document 200C is a description attribute. Based on an example naming convention where value-type attributes are identified with a leading underscore, the indexer instance 122 determines the description attribute is a term-type attribute. As a result, the indexer instance 122 tokenizes the attribute value "warm blooded" generating two terms "warm" and "blooded" (and may convert the attribute value into lower or upper case to provide case insensitivity). In some examples, stop words such as "and," "the," "it," etc. are ignored during tokenization. The indexer instance 122 checks whether a bitmap exists for each term under corresponding document type "class." Assuming documents 200A and 200B were the only documents previously indexed, no such bitmaps would exist for the terms "warm" and "blooded." The indexer instance 122 can determine whether a bitmap exists for a term (whether term- or value-type) by attempting to read a bitmap having a key based on that term. If no value is returned, the indexer instance 122 has determined that the bitmap does not exist. As a result, the indexer instance 122 would create a new bitmap under the document type-attribute-term keys-one for class-description-warm and another for class-description-blooded, setting the bits in the corresponding bit positions. As a result, the bitmap for class-description-warm would be 001 and the bitmap for class-description-blooded would be 001.

If a bitmap existed for a particular key (e.g., a bitmap was returned from an attempted read), the indexer instance 122 would set the bit in the corresponding bit position for the document being indexed in that existing bitmap. For example, if processing document 200D after document 200C, a bitmap for the class-description-blooded key would already exist since document 200C included the terms "cold blooded" in the document type-attribute combination. Given the indexer instance 122 assigned bit position 3 to document 200C having identifier "reptile" (see mapping data 151), the indexer instance 122 would update the bitmap for the class-description-blooded key from 001 to 0011.

The indexer instance 122 can update mapping data 151 as documents are processed. Mapping data typically includes forward mappings (e.g., from bitmap indices to document identifier) and may include reverse mappings (e.g., from document identifiers to bitmap indices). In some examples, the indexer instance 122 can store other data in the mapping data 151. For example, indexer instance 122 can store an indication of the documents size. For example:

| Forward Mapping Data | | |
|---|---|---|
| Key | Value | Size |
| 0 | Animal-1 | ### |
| 1 | Animal-2 | ### |

During indexing operations, the indexer instance 122 can also create or update the relevance factors 152 in the environment. Relevance factors 152 can be used in the processing of search queries by a search instance to score (and potentially sort) the documents matching a query. As illustrated, each term that appears in a document can have an associated relevance factor (there are relevance factors in 152 for each of the set bits in the bitmaps 150). While relevance factors 152 are illustrated separately from the bitmaps 150, in some examples, the relevance factors can be stored as a separate value in the same table as the bitmaps 150 since search queries typically involve retrieval of both the bitmaps and relevance factors for a given key. Loading an entry for the key would thus load both the bitmap and the associated relevance factors, the latter optionally stored in compressed form and uncompressed when read from the environment.

The indexer instance 122 can calculate relevance factors for a given appearance of a term in an attribute in various ways. In some examples, the relevance factor is based on the number of appearances of the term in the attribute. The following pseudo-code where occurenceCount corresponds to the number of appearances of term (e.g., in the tokenized terms) is illustrative:

```
if occurrenceCount < 24:
    occurrenceValue = 64 – occurrenceCount
else if occurrenceCount < 256:
    occurrenceValue = 40 – occurrenceCount / 10
else
    occurrenceValue = 0
```

In other examples, the relevance factor is based on the first appearance of the term in the attribute. The following pseudo-code where position corresponds to the first position of the term (e.g., in the tokenized terms) is illustrative:

```
positionValue = 0
if position < 24:
    positionValue = 64 – position
else if position < 256:
    positionValue = 40 – position / 10
else
    positionValue = 0
```

In other examples, the relevance factor is based on a combination of the number of appearances of the term and the position of the first appearance of the term (e.g., occurrence Value+position Value). The example relevance factors illustrated in FIG. 2 are based on this combination (e.g., occurrenceCount and position are both less than 24).

Other techniques can be used to calculate the relevance factors such as the term frequency-inverse document frequency statistic.

In some examples, relevance factors are mapping to unsigned 8-bit value to reduce load times during the processing of search queries.

During indexing operations, the indexer instance 122 can also store the ingested documents (or delete documents) from the documents 153 (not shown) in the environment. The documents 153 can be a key-value table with the document identifier serving as the key and document as the corresponding value. In some examples, if a document's size exceeds a certain threshold, the indexer instance 122 can store the ingested document in another data store with the value associated with the key being a reference to the location of the document in the other data store.

In some examples, the indexer instance 122 can add an attribute to indexed documents to record the bitmap index assigned to the document in the bitmaps. For example, the indexer instance 122 can add the "index" attribute to document 200A stored in the documents 153 as follows:

```
{
    "_index": 0,
    "_entity": "animal",
    "_id": "dog",
    "name": "dog",
    "_class": "mammal"
}
```

Figure 3:
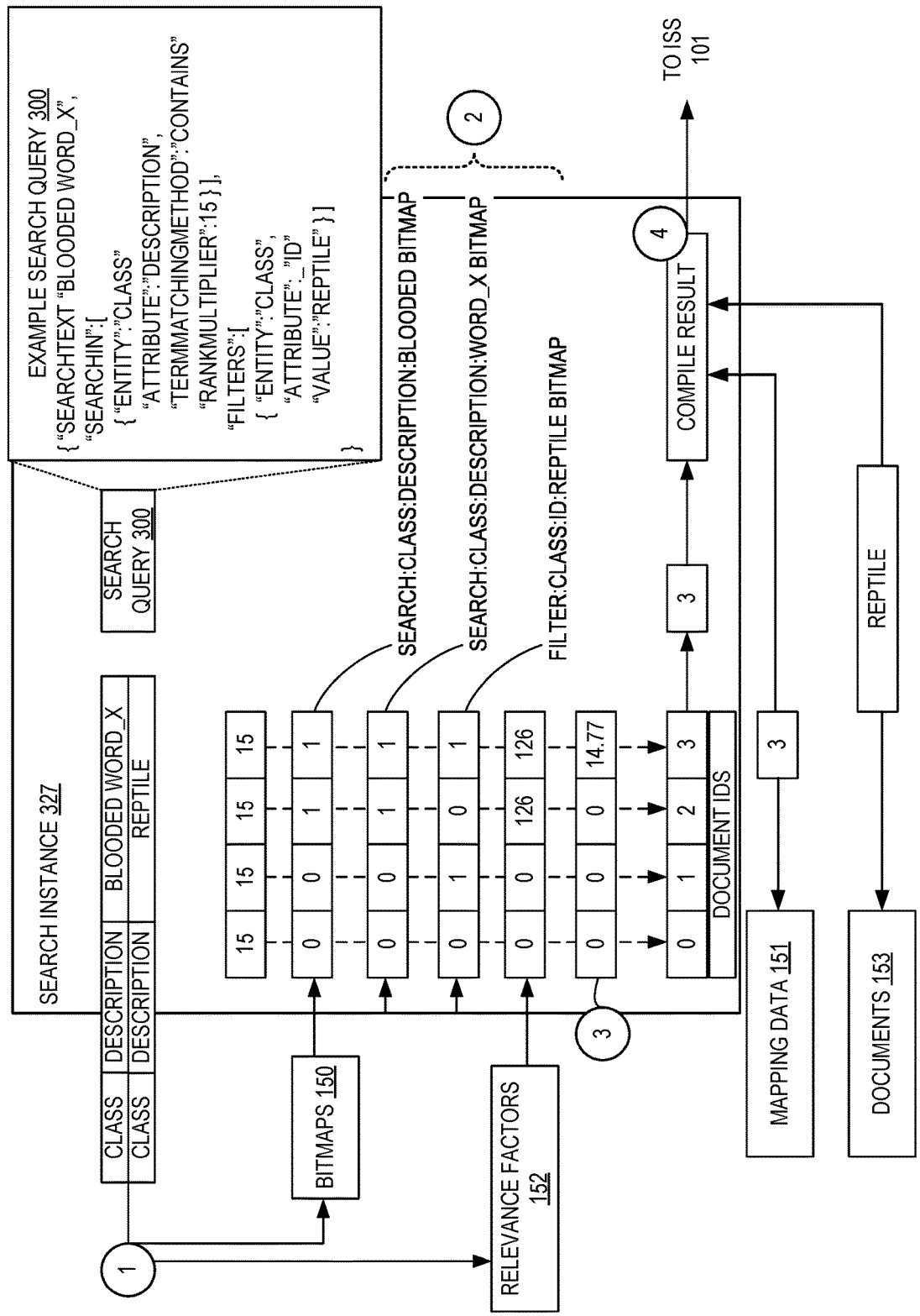
FIG. 3 illustrates example search operations of the index-based search service of FIG. 1 in accordance with one or more embodiments of the present disclosure.

FIG. 3 illustrates example search operations of the index-based search service of FIG. 1 in accordance with one or more embodiments of the present disclosure.

Referring to FIG. 3, the search function 125 processes search queries using indexer function 120-generated indexes. In general, the search function 125 executes search queries and identifies documents that match the query without accessing the documents themselves. The resulting document(s) may be accessed as part of generating or compiling a search response that includes the resulting document(s).

In this example, the search instance 327 (executing the search function 125) processes an exemplary search query 300, which may have been passed via an environmental variable. The search query 300 includes a "searchtext" attribute with the text to search for. The search instance 327 can tokenize the searchtext into multiple search text tokens (and may convert the searchtext into lower or upper case to provide case insensitivity). For example, the searchtext "Red Bird" would be broken into the search text tokens "Red" and "Bird." The tokenization may include the multi-pass techniques described above in which universal tokenization rules are applied to identify different terms and their respective languages, and then to apply language-specific tokenization rules to the identified terms to generate the search text tokens for the search.

The search query 300 includes a "searchin" attribute that identifies one or more document-type attribute combinations in which to search for the search text tokens. Each combination can include a "termmatchingmethod" which may support different matching techniques such as "exact" for a search text token that matches a full indexed term, "begins_with" for a search text token that matches the beginning of an indexed term, "contains" for an indexed term that contain the search text token, etc. Each combination can also include a "rankmultiplier" to scale the relevance factor(s) of the documents identified within that combination. In the example search query 300, the search is looking for terms that contain the searchtext "blooded WORD_X" (e.g., multiple languages) in the "description" attribute of documents of type "class." In some examples, the search instance 327 adjusts the rankmultipler for stop words (e.g., by dividing the rank multiplier by a factor such as 2).

The search query 300 includes a "filters" attribute that identifies one or more document-type attribute combinations that have a value matching the "value." Such filters are typically performed on value-type attributes. In the example search query 300, the search is filtering based on documents having a "reptile" value in the "_id" attribute of documents of type "class." Note that this example is rather contrived given queries would typically not filter based on the unique document identifier; it is intended to illustrate the filtering feature given the example documents presents in FIG. 2.

At circle 1, the search instance 327 would process the search query 300 to identify the implicated bitmaps and relevance factors and load them from the searchable document set. The search instance would retrieve the bitmap for each search term token for each document type-attribute combination(s) in "searchin." Here, there are multiple search term tokens, so the search instance 327 would load the bitmaps and relevance factors corresponding to the class-description-blooded key and to the class-description-WORD_X key. Additionally, the search instance would retrieve the bitmap associated with the filter(s), here the bitmap corresponding to the class-_id-reptile key.

At circle 2, the search instance 327 performs bitwise operations to identify the documents that match the search query 300. Here, the search instance 327 would perform a bitwise AND operation between the class-description-blooded bitmap and the class-_id-reptile bitmap, and between the class-description-WORD_X bitmap and the class-_id-reptile bitmap. That is, the 0011 bitmaps are ANDed with the 0001 bitmap, resulting in a 0001 bitmap. Note that the search instance 327 identified documents responsive to the search query 300 without accessing the documents themselves.

In some examples, if multiple searchin combinations are present, the search instance 327 performs a bitwise OR operation on those bitmaps (e.g., the term can be found in any one of the searchin document type-attribute combinations). If multiple search text tokens are present, the search instance 327 performs a bitwise AND operation on those bitmaps resulting from the searchin OR operation to ensure that the resulting documents contain all of the search term tokens. If multiple filters are present, the result of the AND operation would be ANDed with each of the filter bitmaps.

At circle 3, the search instance 327 scores the documents that match the searchtext (e.g., one or more of the tokens generated from the searchtext), searchin, and filters. Since the document in bit position 3 of the resulting bitmap is the only document that passed the search and filter, the search instance 327 calculates its score. In this example, the search instance 327 calculates the score by multiplying the rank included with the search query 300 by a scaled relevance factor. For example, if the relevance factor was an 8-bit unsigned value based on the combination of term count and position, the search instance 327 could scale the relevance factor by dividing it by 128 thereby boosting certain documents (with a value over 1) and penalizing others (with a value less than 1). In this example, the relevance factor, 126, is divided by 128 and then multiple by the query-provided rank, 15, resulting in a document score of 14.77.

At circle 4, the search instance 327 compiles a result identifying and possibly including the documents that passed the search and filter operations, typically sorting the result by score. The search instance 327 retrieves the document identifiers associated with the set bit positions in the bitmap resulting from the search and filter operations from the mapping data 151. In some examples, the search instance 327 compiles a result having each of the document identifiers and their associated score without including the underlying documents. In other examples, the search instance 327 includes the resulting documents in the result by retrieving them the documents 153 based on the document identifiers retrieved from the mapping data 151.

In the illustrated example, the bitmap resulting from the search and filtering operations had a single result—the document associated with the bitmap index 3. Using the bitmap index as a key, the search instance 327 would retrieve the document identifier "reptile" from the mapping data 151. The search instance could then retrieve the document having the document identifier "reptile" from the documents 153.

As illustrated in FIG. 3, the search instance 327 would return the compiled result to the ISS 101.

Figure 4:
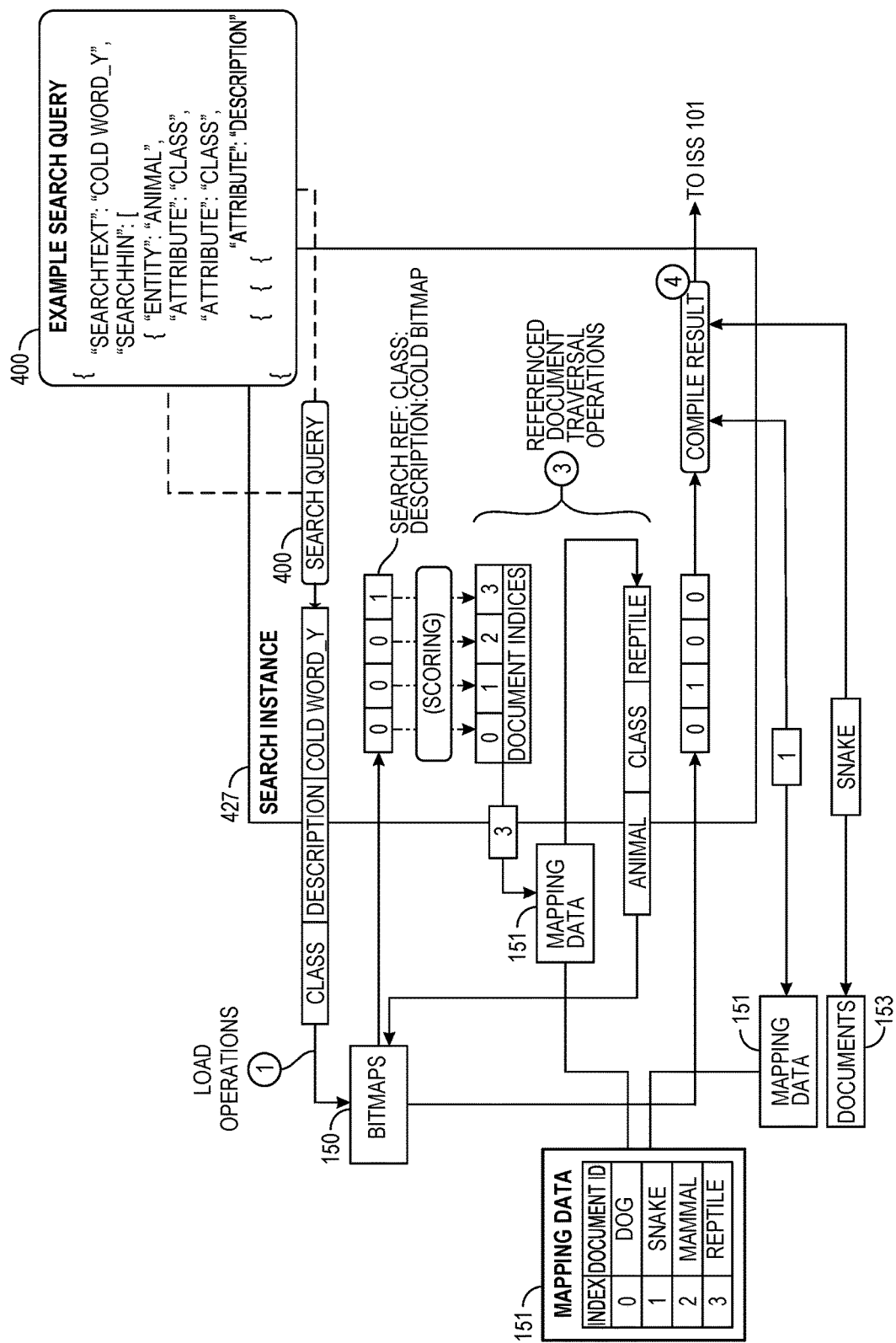
FIG. 4 illustrates an example search reference features of the index-based search service of FIG. 1 in accordance with one or more embodiments of the present disclosure.

FIG. 4 illustrates an example search reference features of the index-based search service of FIG. 1 in accordance with one or more embodiments of the present disclosure.

The reference feature allows documents to be identified in search results based on references to other documents that contain the search term(s). In this example, the search instance 427 (executing the search function 125) processes the example search query 400, which may have been passed via an environmental variable. Search query 400 is used to illustrate an example set of search instance operations to carry out the reference feature. The search instance 427 may apply the multi-pass tokenization techniques described above in which universal tokenization rules are applied to identify different terms and their respective languages, and then to apply language-specific tokenization rules to the identified terms to generate the search text tokens for the search.

The search query 400 includes a "searchtext" attribute with a value of "cold WORD_Y," in which there are two words ("cold" in English, and WORD_Y in English or a different language). The searchin attribute identifies "animal" document types to return in the result. The "searchin" attribute includes a "ref" (reference) attribute to indicate that the "class" attribute in "animal" should be interpreted as a reference to the "description" attribute in "class" document types. In this manner, a search can be carried out returning documents that reference other documents that include an attribute matching the search term(s). In some embodiments, the searchtext attribute may have multiple values in multiple languages as described above. To identify the searchtext attribute values, the multi-pass tokenization may be applied. In one or more embodiments, a first pass of tokenization at the attribute level may determine the language of the attribute value. A first pass of tokenization at the term level may determine the language of individual terms of a given attribute value. In this example, the first pass may identify "cold" with a confidence level that the term is in the English language, and "WORD_Y with a confidence level that the term is in a respective language. Then, English-specific tokenization rules may be applied to English terms, and language-specific tokenization rules may be applied to terms in other languages, resulting in search tokens with which to perform the search. Similarly, if the attribute values were "mammals les mammifères" (e.g., mammals being in English and les mammifères being in French), the first pass may apply universal (global) tokenization rules to split the text into terms: [mammals, les mammifères]. The service then may perform language detection on each term independently and assign a language based on a confidence level that the term is in a particular language (e.g., confidence >0.8 or another threshold): [mammals: English, les mammifères: French]. As a result, each search term may be assessed for its language. When the language is detected with sufficient confidence, the language-specific tokenization rules may be applied to each term. For example, an English-specific rule may apply stemming so that "mammals" becomes "mammal." A French-specific rule may remove articles so that "les mammifères" becomes "mammifères," and another French-specific rule may apply stemming so that "mammifères" becomes "mammifère."

At circle 1, the search instance 427 would process the search query 300 to identify the implicated bitmaps and load them from the searchable document set. In processing a reference query, the search instance 427 traverses the query upward from the deepest reference (references can be nested). Here, the search instance 427 loads the bitmap corresponding to the class-description-cold key and the bitmap corresponding to the class-description-WORD_Ykey based on the reference attribute and the tokenized versions of the searchtext after the global and language-specific tokenization rules have been applied to the terms.

At circle 2, the search instance 427 performs the search for the tokenized searchtext "cold" and "WORD_Y" by evaluating the bitmap, and scoring the documents using rankings and relevance factors (not shown in detail). Here, the search instance 427 determines that the document associated with bitmap index 3 includes one of the search terms (e.g., search tokens/tokenized search terms).

At circle 3, the search instance 427 retrieves the bitmaps associated with the "searchin" entity-attribute and each of the document identifiers associated with the document indices found during the prior search. By doing so, the search instance "traverses" the reference chain in the query 400 from the documents indicated by the bitmap used in the search for the terms "cold" and "WORD_Y" to the documents that reference those documents. Here, a single document was identified having bitmap index 3. Using bitmap index 3 and the mapping data 151, the search instance 427 determines that the document identifier associated with bitmap index 3 is "reptile." The search instance 427 retrieves the animal-class-reptile bitmap from bitmaps 150 to identify the documents that are of the animal document type having a class attribute (from "searchin") referencing "reptile." If multiple document indexes were identified at circle 2, the search instance 427 would retrieve the associated animal-class bitmaps for each of the identified document identifiers.

At circle 4, the search instance 427 compiles the results. The search instance uses the animal-class-reptile bitmap ("0100") to determine that the document with bitmap index 1 references "cold" via the class (reptile)→description reference. The search instance 427 can determine that bitmap index 1 is the document having document identifier "snake" via the mapping data 151, and then retrieve the "snake" document from the documents 153 to be returned to the ISS 101 as the search result. The above search operations described for search query 400 identified documents that reference other documents that included the searchtext without accessing the underlying documents until the results compilation.

The search instance 427 can rank the resulting documents based on the score associated with the earlier search and scoring operations. Thus, the "snake" document would be scored based on the score of the document with bitmap index 3 in the class-description-cold search.

Figure 5:
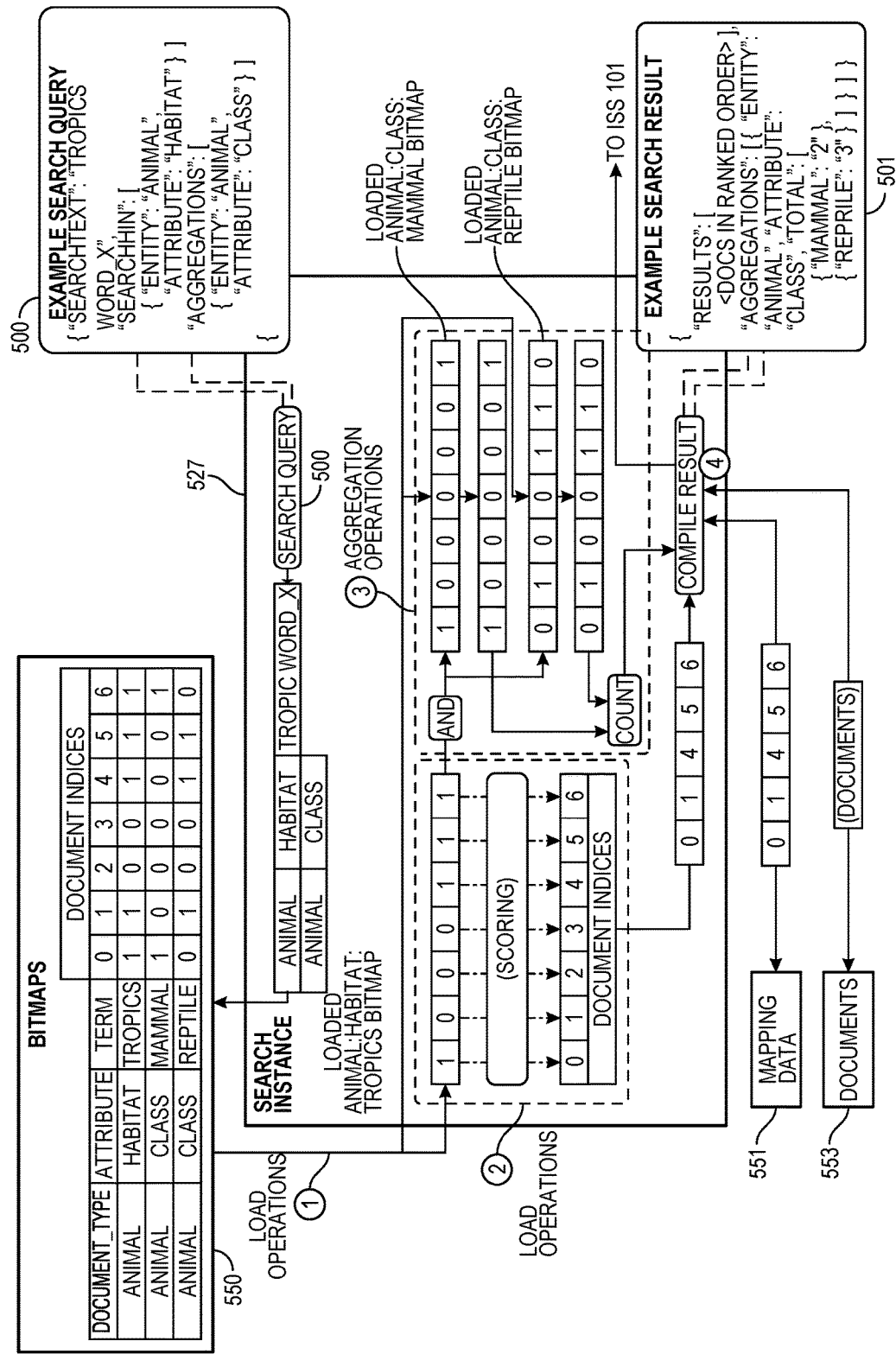
FIG. 5 illustrates an example search aggregation feature of the index-based search service of FIG. 1 in accordance with one or more embodiments of the present disclosure.

FIG. 5 illustrates an example search aggregation feature of the index-based search service of FIG. 1 in accordance with one or more embodiments of the present disclosure.

Referring to FIG. 5 a search query including an aggregation request returns a search result that includes indications of how many matching documents exist within categories or classes of documents. In search applications, aggregations are sometimes referred to as faceting. In this example, the search instance 527 (executing the search function 125) processes the example search query 500, which may have been passed via an environmental variable. Search query 500 is used to illustrate an example set of search instance operations to carry out the aggregation feature.

To better illustrate an aggregations example, the bitmaps 550 have been extended from bitmaps 150 to include three additional documents (not shown, represented at bitmap indices 4, 5, and 6) and to include an additional habitat attribute for documents of type animal (not shown in documents 200). The bitmap for a "tropics" term for the habitat attribute is shown in bitmaps 550 based on a multi-lingual searchtext of "tropics WORD_X." The first past of tokenization may identify the English word "tropics" and the word: WORD_X" (e.g., in any language), which may be further tokenized using language-specific rules. For example, "tropics" may become "tropic" for the search, based on English-specific tokenization rules.

The search query 500 includes a "searchtext" attribute with a value of "tropics WORD_X," a "searchin" attribute identifying the "habitat" attribute of "animal" document types. An aggregation is included requesting aggregations of the results based on the "class" attribute of the "animal" document types.

At circle 1, the search instance 527 loads the animal-habitat-tropics bitmap indicated by the "searchin" and "searchtext" query attributes. The search instance 527 loads each of the bitmaps indicated by the animal-class query aggregation attribute. Here, the animal-class-mammal and animal-class-reptile bitmaps are loaded (for the aggregations portion of the query, indicated at circle 3, right).

At circle 2, the search instance 527 performs the search for the searchtext "tropics WORD_X" (e.g., using the tokenized "tropic" and a tokenized form of WORD_X") by evaluating the bitmap(s), scoring the documents using rankings and relevance factors (not shown in detail). Here, the search instance 527 determines that the document associated with bitmap indexes 0, 1, 4, 5, and 6 include the search term.

At circle 3, the search instance 527 performs the aggregation operations requested in the query. The search engine 527 performs a bitwise-AND operation between each of the loaded animal-class bitmaps and the search result bitmap (in this case, the search result corresponds to the animal-habitat-tropics bitmap). The number of bits in the result of each of those AND operations is counted, indicating the number of documents in the animal-class mammal is 2 and the number of documents in the animal-class reptile is 3.

At circle 4, the search instance 527 compiles the results. The search instance 527 retrieves the document identifiers associated with the bitmap indexes identified at circle 2 from the mapping data 551 (e.g., mapping data 151 extended for the additional documents). The search can then retrieve the documents associated with the retrieved document identifiers from the documents 553 (e.g., documents 153 extended for the additional documents). The search instance 527 can include the sorted documents and associated scores in the example search result 501 as indicated. The search instance 527 can further include the per-animal-class aggregation counts such as indicated in the example search result 501. The above search operations for search query 500 generated aggregations without accessing the underlying documents until the results compilation.

Figure 6:
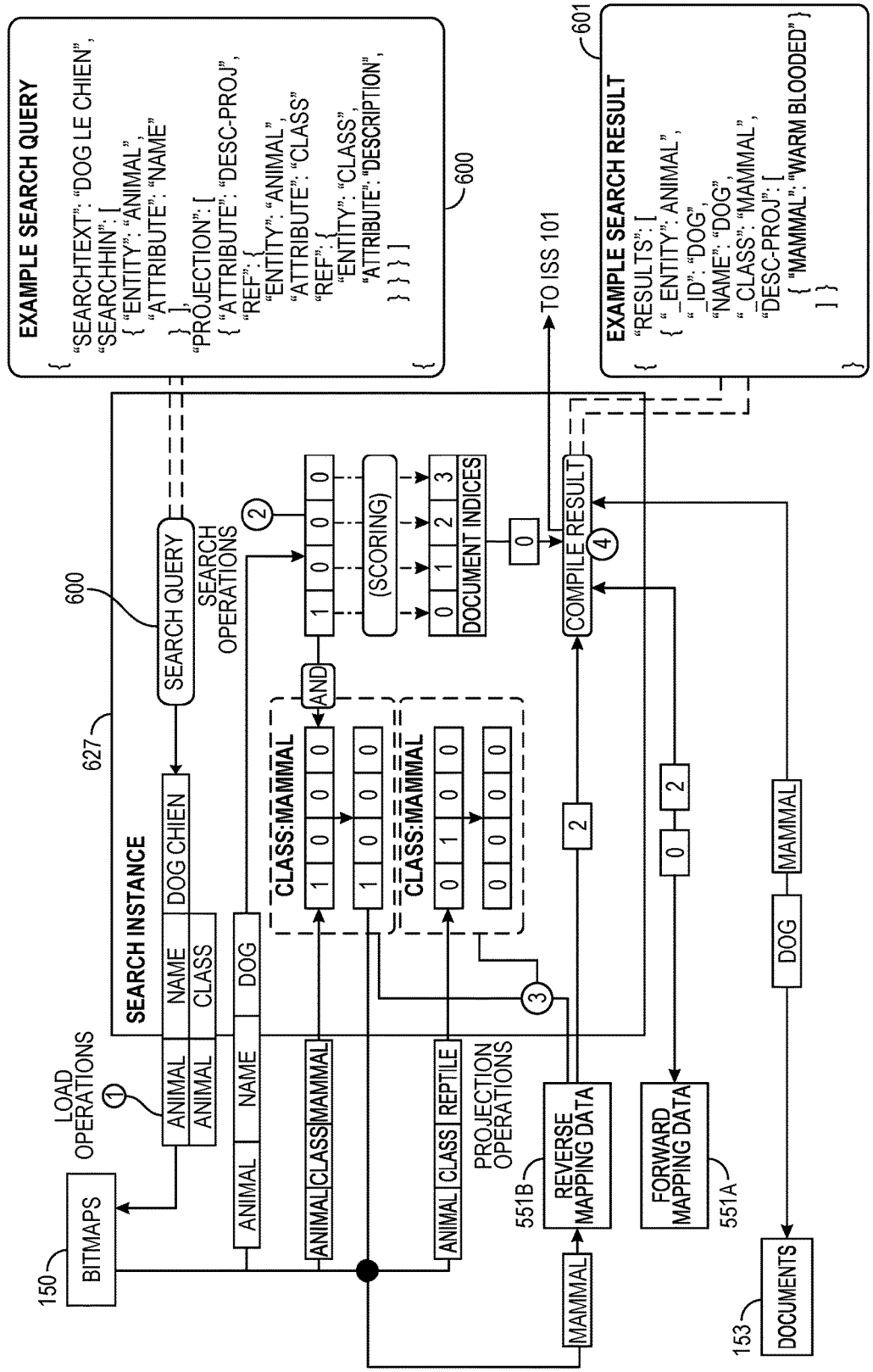
FIG. 6 illustrates an example search projection feature of the index-based search service of FIG. 1 in accordance with one or more embodiments of the present disclosure.

FIG. 6 illustrates an example search projection feature of the index-based search service of FIG. 1 in accordance with one or more embodiments of the present disclosure.

Referring to FIG. 6, a search query including a projection request includes, within each of the resulting documents, a new attribute having a value corresponding to the value of a document referenced by the document result, if available. In this manner, a value from a referenced document is "projected" into a search result document that references (indirectly or directly) the referenced document. In this example, the search instance 627 (executing the search function 125) processes the example search query 600, which may have been passed via an environmental variable. Search query 600 is used to illustrate an example set of search instance operations to carry out the projection feature.

The search query 600 includes a "searchtext" attribute with a value of "dog le chien," (e.g., "dog" in English, and "le chien" in French) a "searchin" attribute identifying the "name" attribute of "animal" document types. A projection is included indicating that an attribute having the name "desc-proj" should be added to the search results and populated with the description attribute of class document types as indicated in the nested "ref" as referenced through the class attribute of the animal document types in the first level "ref."

At circle 1, the search instance 627 loads the animal-name-dog bitmap indicated by the "searchin" and "searchtext" query attributes. The search instance 627 loads each of the bitmaps indicated by the animal-class first level projection "ref." Here, the animal-class-mammal and animal-class-reptile bitmaps are loaded (for the projection portion of the query, indicated at circle 3, left).

At circle 2, the search instance 627 performs the search for the searchtext "dog chien" (e.g., the resulting search tokens after the multi-pass tokenization) by evaluating the bitmap, scoring the documents using rankings and relevance factors (not shown in detail). Here, the search instance 627 determines that the document associated with bitmap index 0 includes the search term.

At circle 3, the search instance 627 performs the projection portion of the query. The search instance 627 performs a bitwise-AND between each of the loaded animal-class bitmaps and the search result bitmap (in this case, the search result corresponds to the animal-name-dog bitmap). With the class attribute of the animal document types corresponding to the entity attribute in the nested ref, the search instance 627 uses the class having any set bits in the result of the bitwise-AND in a lookup to identify the document having the attribute to use in the projection. Here, the "mammal" class is referenced in the dog search result, so the search instance performs a lookup on the "mammal" document identifier in the reverse mapping data 551B to determine that the document identifier "2" includes the class-description attribute to project into the search result.

At circle 4, the search instance 627 compiles the results. The search instance 627 fetches the document identifiers associated with bitmap indexes 0 (from the search operations) and 2 (from the projection operations) from the forward mapping data 551 respectively resulting in document identifiers "dog" and "mammal." The search instance 627 then fetches the "dog" and "mammal" documents from the documents 153. The search instance 627 reads the "description" attribute of the "mammal" document and inserts it into the projection attribute, "desc-proj," of the document in the search result 501. The above search operations for search query 600 generated results 601 including identifying attributes to project without accessing the underlying documents until the results compilation.

In one or more embodiments, with reference to FIGS. 1-6, the language detection at the first pass of the search tokenization may use a language detection library and/or algorithm to detect the language of a search attribute and/or search term. A language detection library may include words in different languages, and when the searchtext attributes or terms at least partially match the words in a library, the confidence score that that attributes or terms are in a given language increase based on the language of the words in the library, for example.

Figure 7:
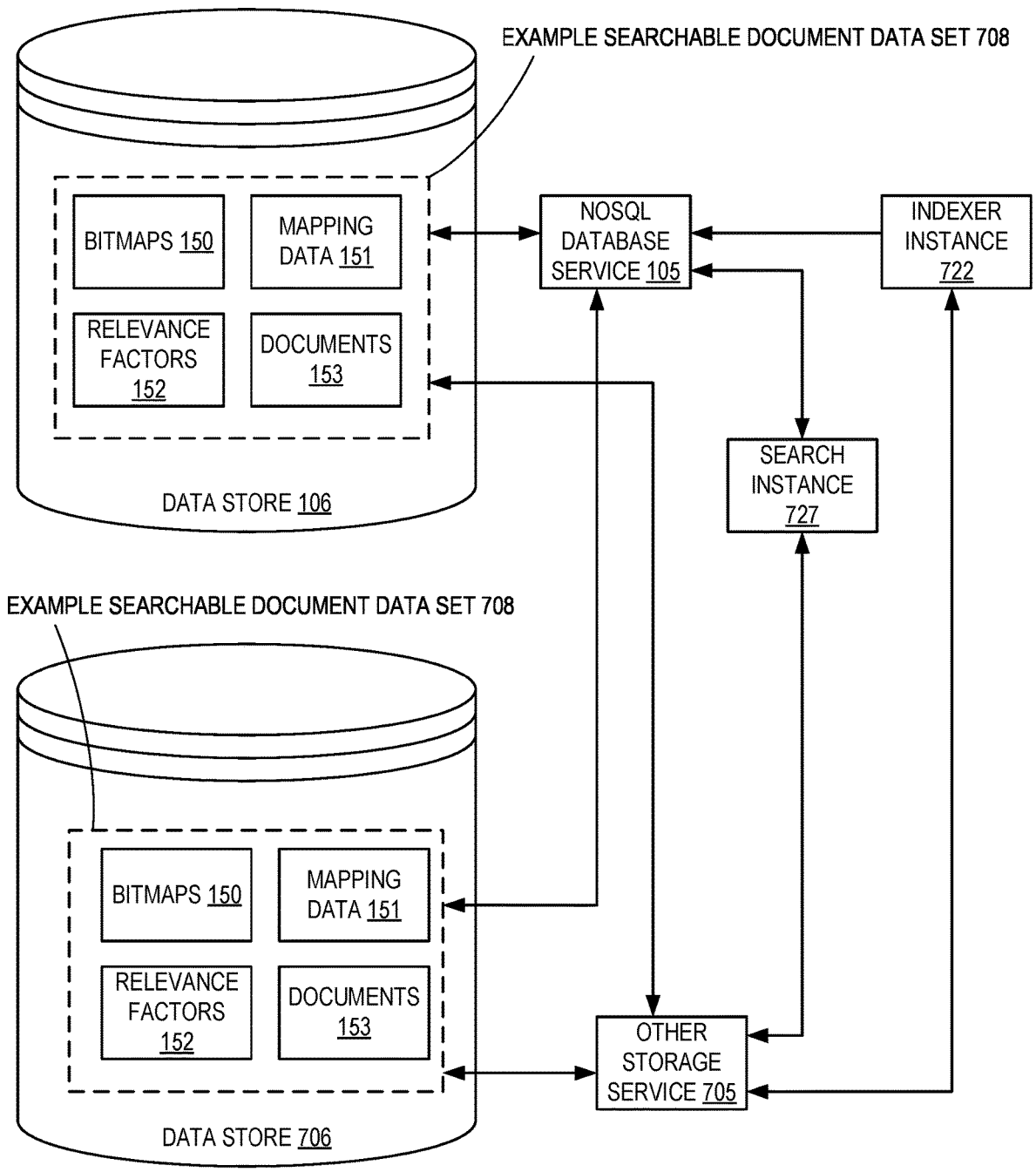
FIG. 7 illustrates an example data storage environment for the index-based search service of FIG. 1 in accordance with one or more embodiments of the present disclosure.

FIG. 7 illustrates an example data storage environment for the index-based search service of FIG. 1 in accordance with one or more embodiments of the present disclosure.

In some cases, different storage backings may offer different levels of performance. For example, the NoSQL database service 105 and data store 106 may offer lower latency but at lower throughput than another storage service 705 and data store 706. The other storage service 705 and data store 706 may, for example, support parallel retrieval requests. During indexing operations, an indexer instance 722 can populate both the data store 706 and the data store 707 with a searchable document set such as the example searchable document set 108.

During search operations, a search instance 727 can selectively retrieve data from the data store 106 (via the NoSQL storage service 105) or the data store 706 (via the other storage service 705) depending on the type and/or size of data being loaded. For example, the search instance 727 can calculate the number of bitmaps to load for a particular query. If the number of bitmaps to load does not satisfy a bitmap quantity threshold, the search instance 727 can load those bitmaps from the lower latency data store 106. Otherwise, the search instance 727 can load those bitmaps from the higher throughput data store 706 since the total retrieval time may negate the lower latency that would be otherwise saved by accessing the bitmaps via data store 106. The search instance 727 can make a similar calculation for loading relevance factors. The bitmap quantity threshold can be calculated or even calibrated based on the relative performance difference between the storage backings.

As another example, during result compilation operations, the search instance 727 can retrieve documents from either the lower latency data store 106 or the higher throughput data store 706 based on their size. In some examples, the search instance 727 can large documents from the data store 706. The search instance 727 can determine the size of a document based on the inclusion of document size in the forward mapping data and evaluate whether that size satisfies a document size threshold, for example. Alternatively, the forward mapping data may include a link to the document in the data store 706 rather than a document identifier reference that could be used to retrieve the document from the data store 106. In either case, the search instance 727 can retrieve the document from the higher throughput data store 706. If the size is below the document size threshold or the link is not present, the search instance 727 can retrieve the document from the lower latency data store 106. The document size threshold can be calculated or even calibrated based on the relative performance difference between the storage backings.

As another example, during result compilation operations, the search instance 727 can retrieve documents from either the lower latency data store 106 or the higher throughput data store 706 based on the quantity of documents to be retrieved. For example, the search instance 727 can determine the number of documents to load based on the bitmap-based search result. If the number of documents to load does not satisfy a document quantity threshold, the search instance 727 can load those documents from the lower latency data store 106. Otherwise, the search instance 727 can load those bitmaps from the higher throughput data store 706 since the total retrieval time may negate the lower latency that would be otherwise saved by accessing the documents via data store 106. If the data store 706 supports parallel accesses, the search instance 727 can submit requests for each of the documents in parallel to the data store 706 via the other storage service 705. The document quantity threshold can be calculated or even calibrated based on the relative performance difference between the storage backings.

Figure 8A:
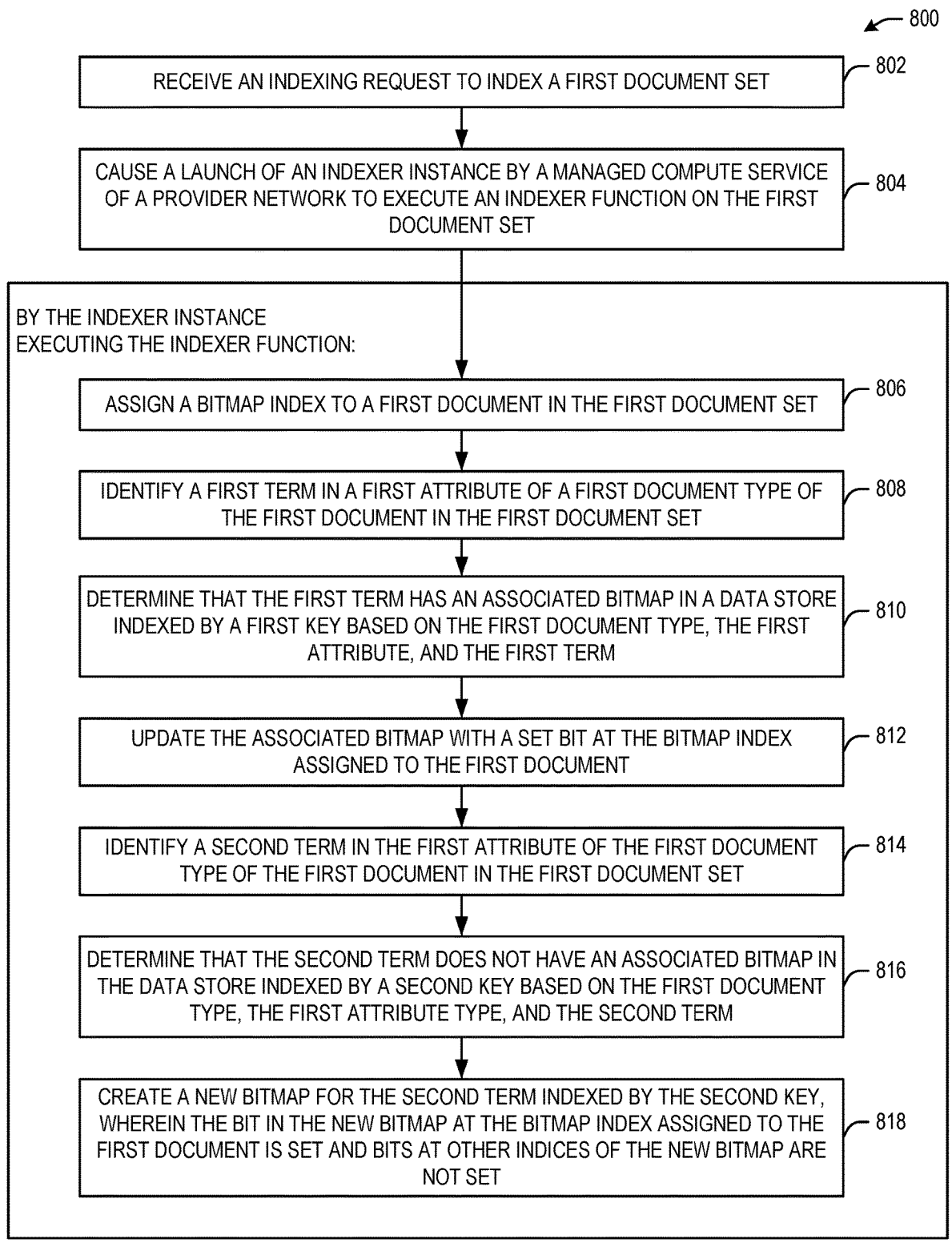
FIG. 8A is an example flow for a process for indexing documents using the index-based search service of FIG. 1 in accordance with one or more embodiments of the present disclosure.

FIG. 8A is a flow diagram illustrating operations 800 of a method for indexing documents using the index-based search service according to some examples. Some or all of the operations 800 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 800 are performed by the ISS 101 and/or an indexer instance of the other figures.

The operations 800 include, at block 802, receiving an indexing request to index a first document set. The operations 800 further include, at block 804, causing a launch of an indexer instance by the managed compute service of the provider network, the indexer instance to execute an indexer function on the first document set. The operations 800 further include, at block 806, by the indexer instance executing the indexer function, assigning a bitmap index to a first document in the first document set. The operations 800 further include, at block 808, identifying a first term in a first attribute of a first document type of the first document in the first document set. The operations 800 further include, at block 810, determining that the first term has an associated bitmap in the data store indexed by a first key based on the first document type, the first attribute, and the first term. The operations 800 further include, at block 812, updating the associated bitmap with a set bit at the bitmap index assigned to the first document. The operations 800 further include, at block 814, identifying a second term in the first attribute of the first document type of the first document in the first document set. The operations 800 further include, at block 816, determining that the second term does not have an associated bitmap in the data store indexed by a second key based on the first document type, the first attribute, and the second term. The operations 800 further include, at block 818, creating a new bitmap for the second term indexed by the second key, wherein the bit in the new bitmap at the bitmap index assigned to the first document is set and bits at other indexes of the new bitmap are not set. Additional details regarding the operations 800 are illustrated and described herein.

Figure 8B:
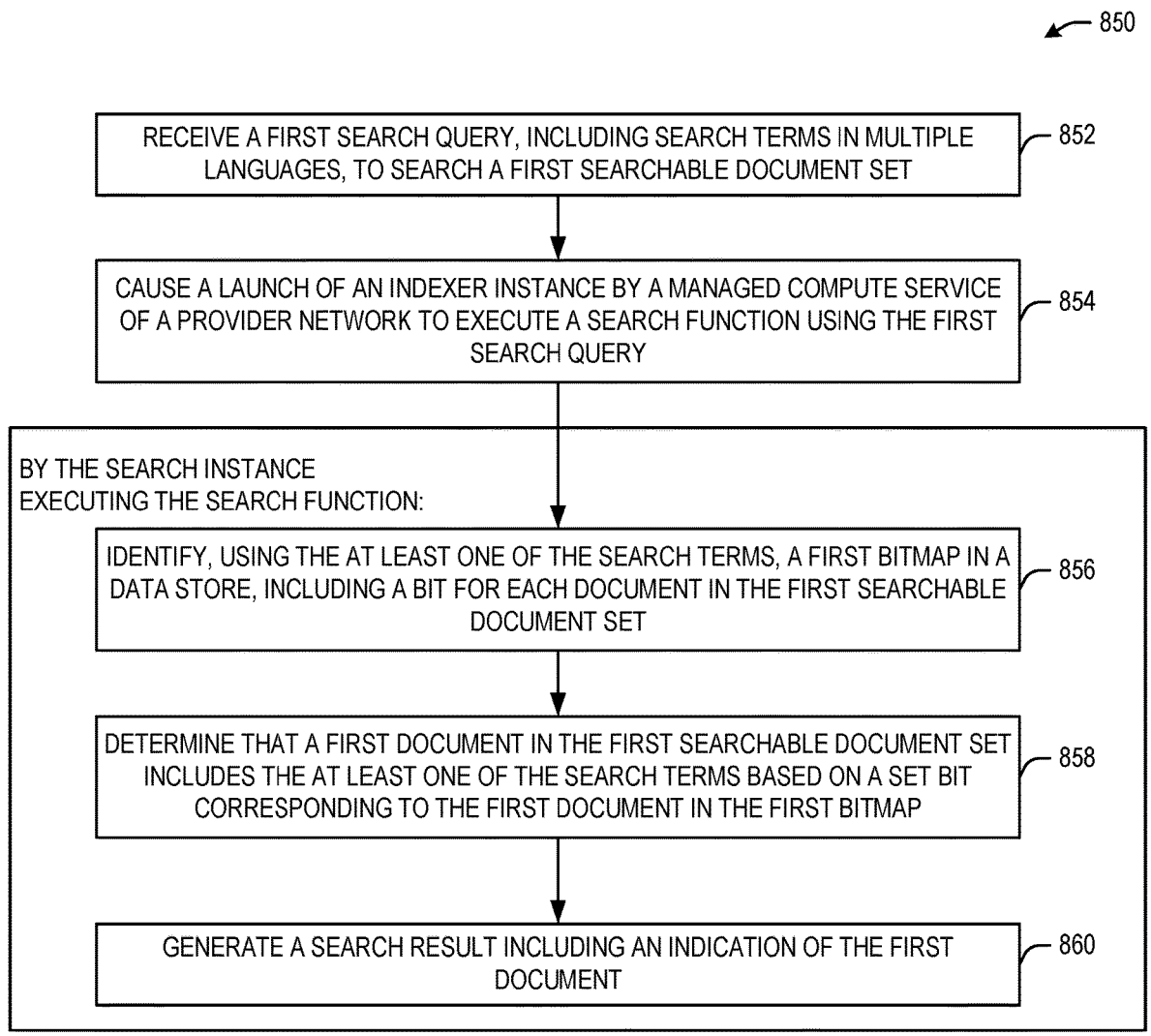
FIG. 8B is an example flow for a process for searching documents using the index-based search service of FIG. 1 in accordance with one or more embodiments of the present disclosure.

FIG. 8B is a flow diagram illustrating operations of a process 850 for searching documents using the index-based search service according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the ISS 101 and or a search instance of the other figures.

The operations include, at block 852, receiving a first search query to search a first searchable document set, the first search query including search term and/or attributes in multiple languages. The operations further include, at block 854, causing a launch of a search instance by a managed compute service of the provider network, the search instance to execute a search function using the first search query. The operations further include, at block 856, by the search instance executing the search function, identifying, using a first search term of the search terms, a first bitmap in a data store, the first bitmap including a bit for each document in the first searchable document set. The operations further include, at block 858, determining that a first document in the first searchable document set contains the first search term based at least in part on a set bit corresponding to the first document in the first bitmap. The operations further include, at block 860, generating a search result, wherein the search result includes an indication of the first document. Additional details regarding the operations are illustrated and described herein. For example, a multi-pass tokenization process may be used to generate tokenized search terms and/or attributes, such as shown in FIG. 9.

Figure 9:
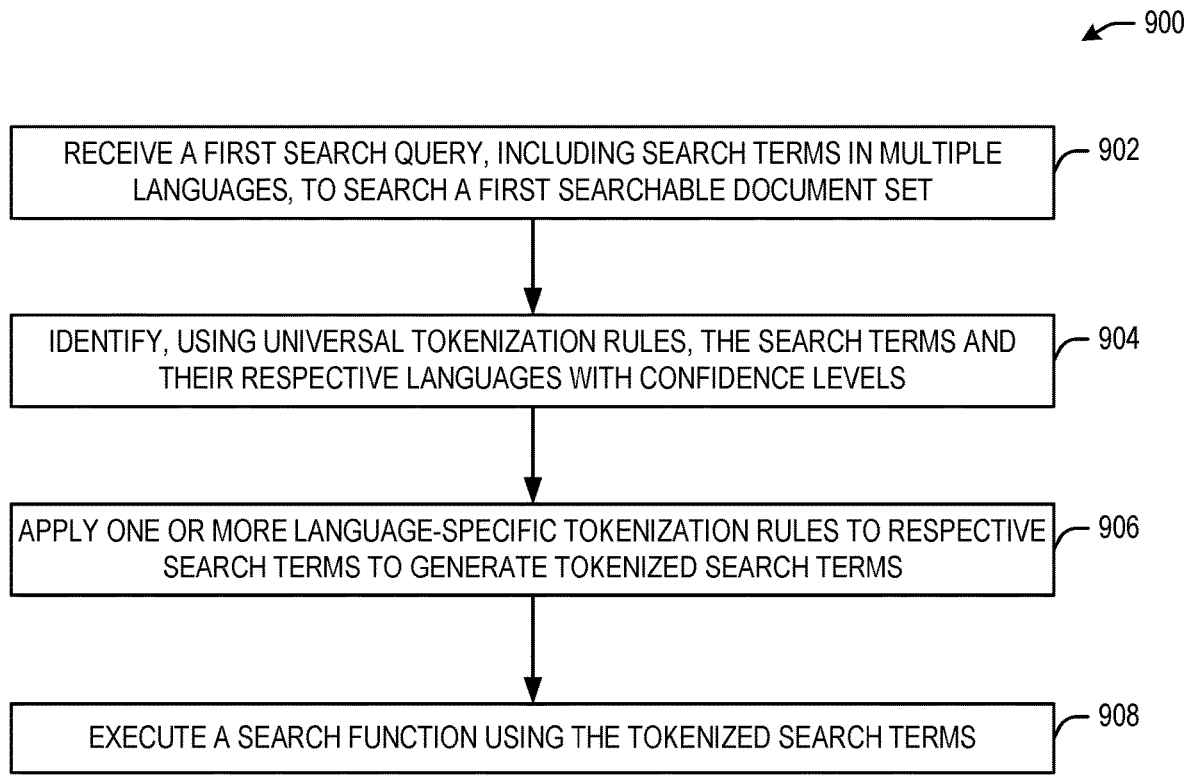
FIG. 9 is an example flow for a process for tokenizing search terms for use in searching documents using the index-based search service of FIG. 1 in accordance with one or more embodiments of the present disclosure.

FIG. 9 is a flow diagram illustrating operations of a process 900 for tokenizing search terms for use in searching documents using the index-based search service according to some examples. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 90 are performed by the ISS 101 and or a search instance of the other figures.

The operations may include, at block 902, receiving a first search query to search a first searchable document set, the first search query including search term and/or attributes in multiple languages. The operations further include, at block 904, applying a first pass of a multi-pass tokenization process in which the first pass applies one or more universal tokenization rules to identify terms and/or attributes in the search query, and confidence scores for their respective languages. For example, a first search term or attribute may at least partially match one or more words in a language library that includes words in multiple languages. The confidence score that a term or attribute is in a particular language may be based on the level of similarity between the term or attribute and a word in the language library and based on the number of words in one or more languages that may be similar to the term or attribute.

The operations also may include, at block 906, applying a second pass of the multi-pass tokenization process in which, for each respective term or attribute in the search query, one or more language-specific tokenization rules may be applied to the term or attribute based on the language of the term or attribute. For example, English-specific tokenization rules may be applied to a term or attribute in English, Japanese-specific tokenization rules may be applied to a term in Japanese, Spanish-specific tokenization rules may be applied to a term in Spanish, etc. An example in German shows how the word "blau" for blue becomes "hellblau" for light blue. In the German example, the English-specific tokenization would not properly segment the terms, so German-specific tokenization rules may be applied based on recognizing that the text is in German.

The result of block 906 may be tokenized search terms or attributes that refine the terms or attributes in the search query for use in an index-based search. At block 908, the operations may include executing a search function using the tokenized search terms/attributes. For example, blocks 856-860 of FIG. 8B may be based on the tokenized search terms/attributes.

These examples are not meant to be limiting.

Figure 10:
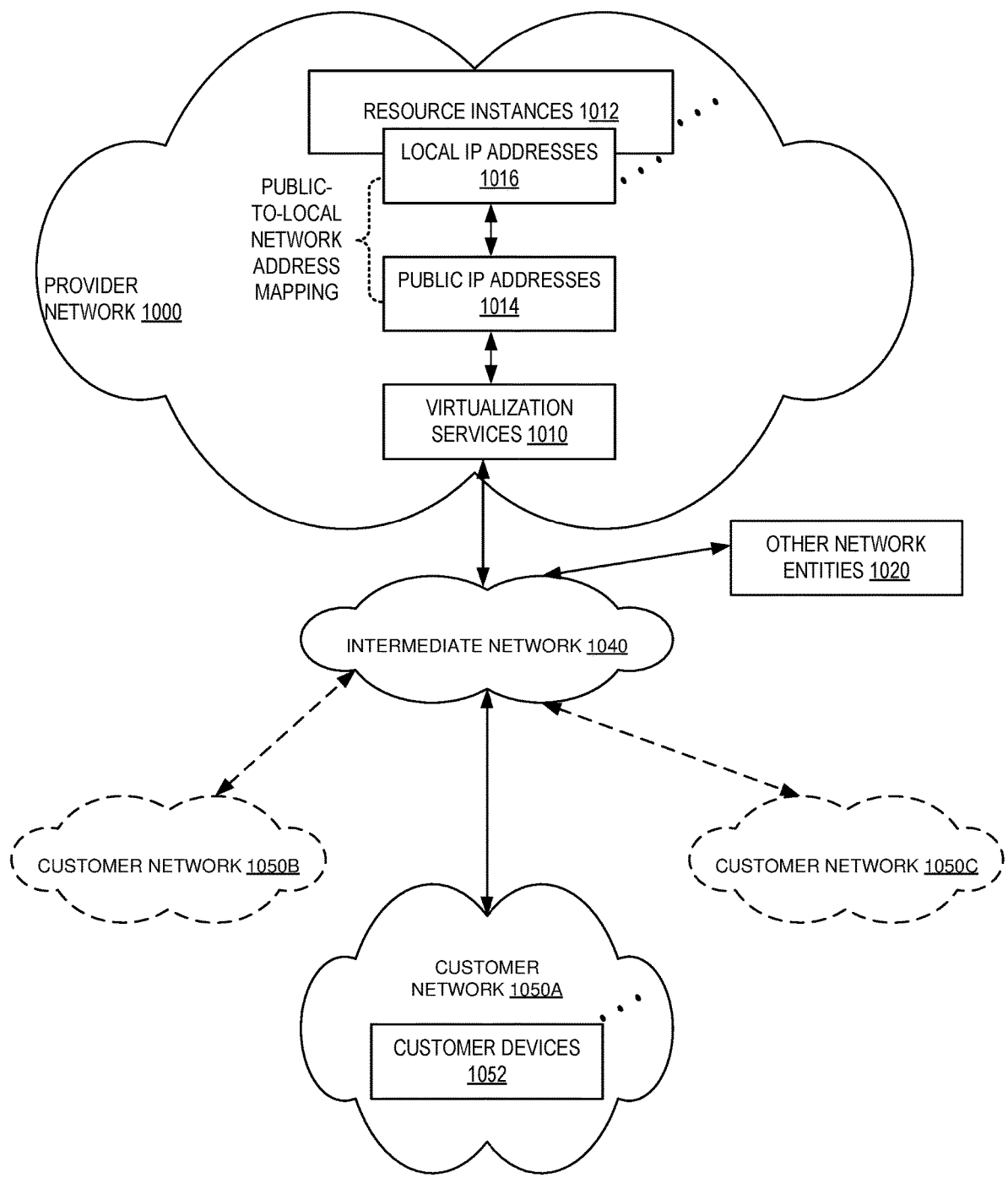
FIG. 10 illustrates an example provider network environment in accordance with one or more embodiments of the present disclosure.

FIG. 10 illustrates an example provider network (or "service provider system") environment according to some examples. A provider network 1000 can provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 can be associated with the resource instances 1012; the local IP addresses are the internal network addresses of the resource instances 1012 on the provider network 1000. In some examples, the provider network 1000 can also provide public IP addresses 1014 and/or public IP address ranges (e.g., Internet Protocol version 4 (IPv4) or Internet Protocol version 6 (IPv6) addresses) that customers can obtain from the provider 1000.

Conventionally, the provider network 1000, via the virtualization services 1010, can allow a customer of the service provider (e.g., a customer that operates one or more customer networks 1050A-1050C (or "client networks") including one or more customer device(s) 1052) to dynamically associate at least some public IP addresses 1014 assigned or allocated to the customer with particular resource instances 1012 assigned to the customer. The provider network 1000 can also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of the customer network(s) 1050A-1050C can, for example, implement customer-specific applications and present the customer's applications on an intermediate network 1040, such as the Internet. Other network entities 1020 on the intermediate network 1040 can then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 can be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1000; a customer can then assign their allocated public IP addresses to particular resource instances allocated to the customer. These public IP addresses can be referred to as customer public IP addresses, or simply customer IP addresses. Instead of being assigned by the provider network 1000 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
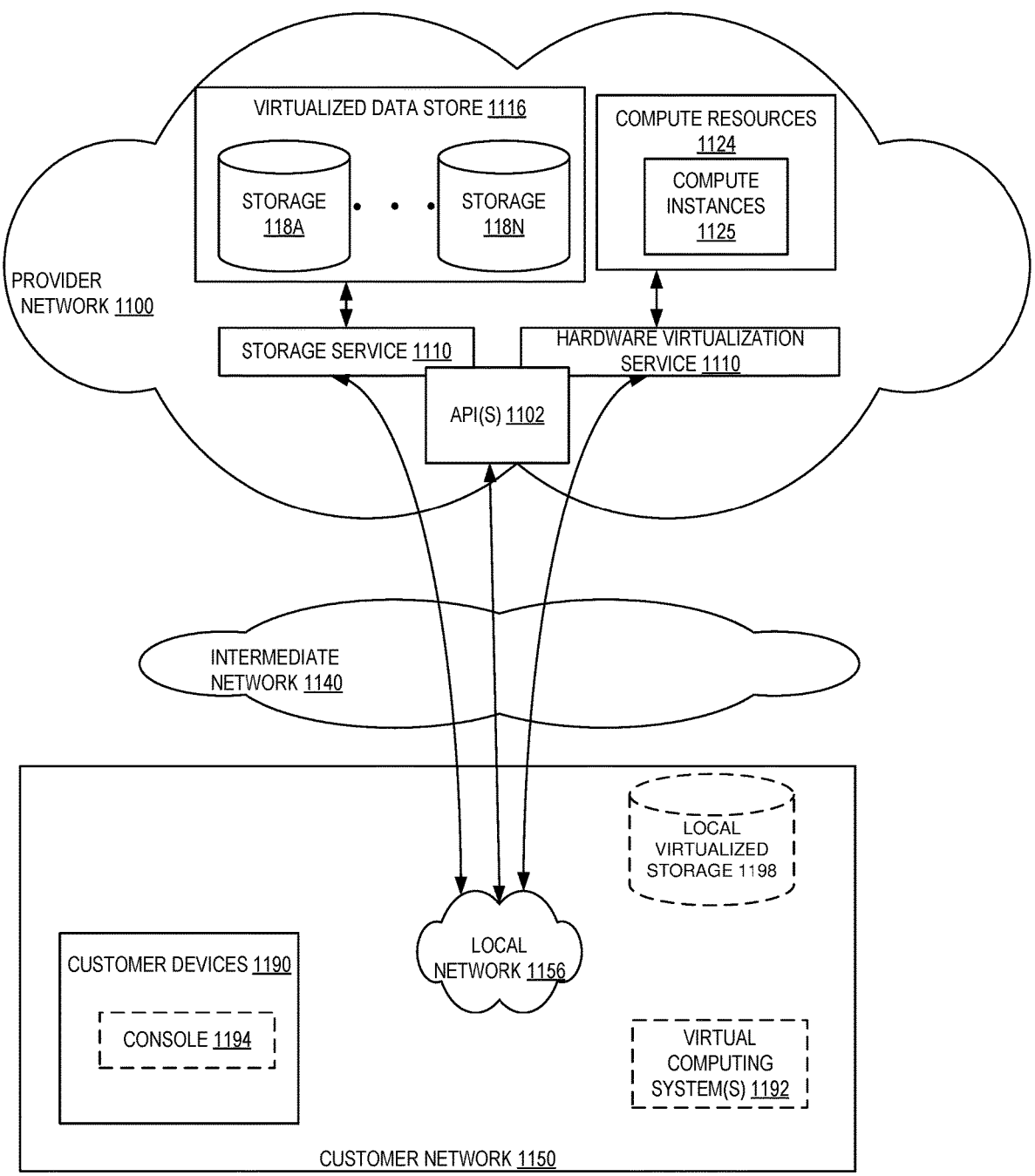
FIG. 11 is a block diagram of an example provider network environment that provides a storage service and a hardware virtualization service to customers in accordance with one or more embodiments of the present disclosure.

FIG. 11 is a block diagram of an example provider network environment that provides a storage service and a hardware virtualization service to customers, according to some examples. A hardware virtualization service 1120 provides multiple compute resources 1124 (e.g., compute instances 1125, such as VMs) to customers. The compute resources 1124 can, for example, be provided as a service to customers of a provider network 1100 (e.g., to a customer that implements a customer network 1150). Each computation resource 1124 can be provided with one or more local IP addresses. The provider network 1100 can be configured to route packets from the local IP addresses of the compute resources 1124 to public Internet destinations, and from public Internet sources to the local IP addresses of the compute resources 1124.

The provider network 1100 can provide the customer network 1150, for example coupled to an intermediate network 1140 via a local network 1156, the ability to implement virtual computing systems 1192 via the hardware virtualization service 1120 coupled to the intermediate network 1140 and to the provider network 1100. In some examples, the hardware virtualization service 1120 can provide one or more APIs 1102, for example a web services interface, via which the customer network 1150 can access functionality provided by the hardware virtualization service 1120, for example via a console 1194 (e.g., a web-based application, standalone application, mobile application, etc.) of a customer device 1190. In some examples, at the provider network 1100, each virtual computing system 1192 at the customer network 1150 can correspond to a computation resource 1124 that is leased, rented, or otherwise provided to the customer network 1150.

From an instance of the virtual computing system(s) 1192 and/or another customer device 1190 (e.g., via console 1194), the customer can access the functionality of a storage service 1110, for example via the one or more APIs 1102, to access data from and store data to storage resources 1118A-1118N of a virtual data store 1116 (e.g., a folder or "bucket," a virtualized volume, a database, etc.) provided by the provider network 1100. In some examples, a virtualized data store gateway (not shown) can be provided at the customer network 1150 that can locally cache at least some data, for example frequently accessed or critical data, and that can communicate with the storage service 1110 via one or more communications channels to upload new or modified data from a local cache so that the primary store of data (the virtualized data store 1116) is maintained. In some examples, a user, via the virtual computing system 1192 and/or another customer device 1190, can mount and access virtual data store 1116 volumes via the storage service 1110 acting as a storage virtualization service, and these volumes can appear to the user as local (virtualized) storage 1198.

While not shown in FIG. 11, the virtualization service(s) can also be accessed from resource instances within the provider network 1100 via the API(s) 1102. For example, a customer, appliance service provider, or other entity can access a virtualization service from within a respective virtual network on the provider network 1100 via the API(s) 1102 to request allocation of one or more resource instances within the virtual network or within another virtual network.

Illustrative Systems

Figure 12:
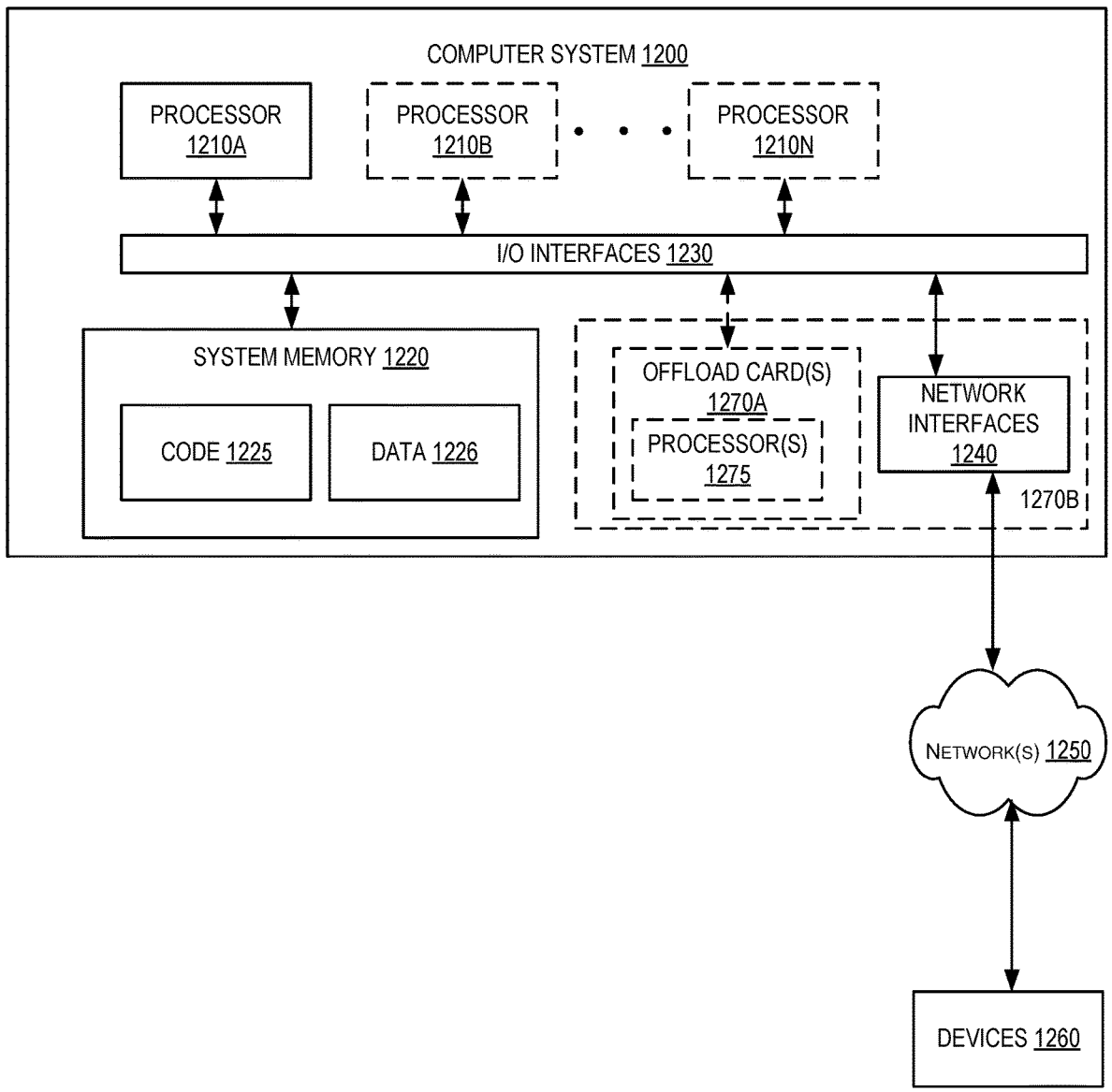
FIG. 12 is a block diagram illustrating an example computer system in accordance with one or more embodiments of the present disclosure.

In some examples, a system that implements a portion or all of the techniques described herein can include a general-purpose computer system, such as the computer system 1200 illustrated in FIG. 12, that includes, or is configured to access, one or more computer-accessible media. In the illustrated example, the computer system 1200 includes one or more processors 1210 coupled to a system memory 1220 via an input/output (I/O) interface 1230. The computer system 1200 further includes a network interface 1240 coupled to the I/O interface 1230. While FIG. 12 shows the computer system 1200 as a single computing device, in various examples the computer system 1200 can include one computing device or any number of computing devices configured to work together as a single computer system 1200.

In various examples, the computer system 1200 can be a uniprocessor system including one processor 1210, or a multiprocessor system including several processors 1210 (e.g., two, four, eight, or another suitable number). The processor(s) 1210 can be any suitable processor(s) capable of executing instructions. For example, in various examples, the processor(s) 1210 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1210 can commonly, but not necessarily, implement the same ISA.

The system memory 1220 can store instructions and data accessible by the processor(s) 1210. In various examples, the system memory 1220 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1220 as code 1225 (e.g., executable to implement, in whole or in part, the ISS 101, the indexer function 120, the search function 125, etc.) and data 1226.

In some examples, the I/O interface 1230 can be configured to coordinate I/O traffic between the processor 1210, the system memory 1220, and any peripheral devices in the device, including the network interface 1240 and/or other peripheral interfaces (not shown). In some examples, the I/O interface 1230 can perform any necessary protocol, timing, or other data transformations to convert data signals from one component (e.g., the system memory 1220) into a format suitable for use by another component (e.g., the processor 1210). In some examples, the I/O interface 1230 can include support for devices attached through various types of peripheral buses, such as a variant of the Peripheral Component Interconnect (PCI) bus standard or the Universal Serial Bus (USB) standard, for example. In some examples, the function of the I/O interface 1230 can be split into two or more separate components, such as a north bridge and a south bridge, for example. Also, in some examples, some or all of the functionality of the I/O interface 1230, such as an interface to the system memory 1220, can be incorporated directly into the processor 1210.

The network interface 1240 can be configured to allow data to be exchanged between the computer system 1200 and other devices 1260 attached to a network or networks 1250, such as other computer systems or devices as illustrated in FIG. 1, for example. In various examples, the network interface 1240 can support communication via any suitable wired or wireless general data networks, such as types of Ethernet network, for example. Additionally, the network interface 1240 can support communication via telecommunications/telephony networks, such as analog voice networks or digital fiber communications networks, via storage area networks (SANs), such as Fibre Channel SANS, and/or via any other suitable type of network and/or protocol.

In some examples, the computer system 1200 includes one or more offload cards 1270A or 1270B (including one or more processors 1275, and possibly including the one or more network interfaces 1240) that are connected using the I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1200 can act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some examples the offload card(s) 1270A or 1270B can perform compute instance management operations, such as pausing and/or un-pausing compute instances, launching and/or terminating compute instances, performing memory transfer/copying operations, etc. These management operations can, in some examples, be performed by the offload card(s) 1270A or 1270B in coordination with a hypervisor (e.g., upon a request from a hypervisor) that is executed by the other processors 1210A-1210N of the computer system 1200. However, in some examples the virtualization manager implemented by the offload card(s) 1270A or 1270B can accommodate requests from other entities (e.g., from compute instances themselves), and can not coordinate with (or service) any separate hypervisor.

In some examples, the system memory 1220 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1200 via the I/O interface 1230. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1200 as the system memory 1220 or another type of memory. Further, a computer-accessible medium can include transmission media or signals such as electrical, electromagnetic, or digital signals, conveyed via a communication medium such as a network and/or a wireless link, such as can be implemented via the network interface 1240.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1118A-1118N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
    receiving, by a search service of a provider network, a first search query to search a first searchable document set, the first search query including a first search term in a first language, a second search term in a second language, and an identification of an attribute in which to search for the first search term and the second search term, the attribute associated with a document type in the first searchable document set;
    applying a universal tokenization rule to divide the first search query into the first search term and the second search term;
    determining that the first search term is in the first language;
    determining that the second search term is in the second language;

applying a first language-specific tokenization rule to tokenize the first search term based on the first search term being in the first language;

applying a second language-specific tokenization rule to tokenize the second search term based on the second search term being in the second language;

causing a launch of a search instance by an on-demand code execution service of the provider network, the search instance to execute a search function for a keyword-based text search using the first search query; and by the search instance executing the search function:
identifying, using the document type, the attribute, the tokenized first search term, and the tokenized second search term, a first bitmap in a data store, the first bitmap including a bit for each document in the first searchable document set;

determining, without accessing a first document, that the first document in the first searchable document set contains at least one of the tokenized first search term or the tokenized second search term based at least in part on a set bit corresponding to the first document in the first bitmap; and generating a search response to the keyword-based text search, wherein the search response includes the first document.

2. The method of claim 1, further comprising:
generating a first confidence score indicating a likelihood that the first search term is in the first language;
generating a second confidence score indicating a likelihood that the second search term is in the second language;
determining that the first confidence score exceeds a confidence threshold; and
determining that the second confidence score exceeds the confidence threshold,
wherein determining that the first search term is in the first language is based on the confidence score exceeding the confidence threshold, and
wherein determining that the second search term is in the second language is based on the confidence score exceeding the confidence threshold.

3. The method of claim 1, wherein the universal tokenization rule further divides the search query into a third search term, the method further comprising:
generating a first confidence score indicating a likelihood that the third search term is in a third language; and
determining that the first confidence score is below a confidence threshold,
wherein to execute the search function using the first search query excludes the third search term from the search function based on the first confidence score being below the confidence threshold.

4. The method of claim 1, wherein to tokenize the second search term comprises to split the second term into a third search term and a fourth search term based on the second language-specific tokenization rule, and wherein to execute the search function using the first search query includes the third search term and the fourth search term in the search function.

5. The method of claim 1, wherein the tokenized first search term forms at least a portion of a key to access the first bitmap.

6. A computer-implemented method comprising:
receiving, by a search service of a provider network, a first search query to search a first searchable document set, the first search query including a first search term in a first language;
applying a first tokenization rule to identify the first search term in the first search query;
determining that the first search term is in the first language;
applying a second tokenization rule to tokenize the first search term based on the first search term being in the first language;
causing a launch of a search instance by a managed compute service of the provider network, the search instance to execute a search function using the first search query for a keyword-based text search; and
by the search instance executing the search function:
identifying, using the tokenized first search term, a first bitmap in a data store, the first bitmap including a bit for each document in the first searchable document set;
determining that a first document in the first searchable document set contains the tokenized first search term based at least in part on a set bit corresponding to the first document in the first bitmap; and
generating a search response to the keyword-based text search, wherein the search response includes an indication of the first document.

7. The method of claim 6, wherein applying the first tokenization rule divides the first search query into the first search term and a second search term, the method further comprising:
determining that the second search term is in a second language.

8. The method of claim 7, further comprising:
applying a third tokenization rule to tokenize the second search term based on the second search term being in the second language.

9. The method of claim 8, wherein to execute the search function includes the tokenized first search term and the tokenized second search term.

10. The method of claim 8, further comprising:
identifying, using the tokenized second search term, a second bitmap in the data store, the second bitmap including a bit for each document in the first searchable document set.

11. The method of claim 10, further comprising:
determining that a second document in the first searchable document set contains the tokenized second search term based at least in part on a set bit corresponding to the first document in the second bitmap.

12. The method of claim 11, wherein the search response further includes an indication of the second document.

13. The method of claim 6, further comprising:
generating a first confidence score indicating a likelihood that the first search term is in the first language;
determining that the first confidence score exceeds a confidence threshold; and
wherein determining that the first search term is in the first language is based on the confidence score exceeding the confidence threshold.

14. The method of claim 6, wherein applying the first tokenization rule divides the first search query into the first search term and a second search term, the method further comprising:
generating a first confidence score indicating a likelihood that the second search term is in a second language; and determining that the first confidence score is below a confidence threshold, wherein to execute the search function using the first search query excludes the second search term from the search function based on the first confidence score being below the confidence threshold.

15. The method of claim 6, wherein to tokenize the first search term comprises to split the first term into a second search term and a third search term based on the second tokenization rule, and wherein to execute the search function using the first search query includes the second search term and the third search term in the search function.

16. The method of claim 6, wherein the tokenized first search term forms at least a portion of a key to access the first bitmap.

17. A system for tokenizing search terms for an index-based search, the system comprising:
- a first one or more electronic devices to implement an index-based search service in a multi-tenant provider network, the index-based search service including instructions that upon execution cause the index-based search service to:
  - receive a first search query to search a first searchable document set, the first search query including a first search term in a first language;
  - apply a first tokenization rule to identify the first search term in the first search query;
  - determine that the first search term is in the first language;
  - apply a second tokenization rule to tokenize the first search term based on the first search term being in the first language; and
  - cause a launch of a search instance by a managed compute service of the multi-tenant provider network, the search instance to execute a search function using the first search query;
- a second one or more electronic devices to execute the search function as the search instance, the search function including instructions that upon execution cause the search instance to:
  - identify, using the tokenized first search term, a first bitmap in a data store, the first bitmap including a bit for each document in the first searchable document set;
  - determine that a first document in the first searchable document set contains the tokenized first search term based at least in part on a set bit corresponding to the first document in the first bitmap; and
  - generate a search response, wherein the search response includes an indication of the first document.

18. The system of claim 17, wherein to apply the first tokenization rule comprises to divide the first search query into the first search term and a second search term, and wherein the instructions further cause the index-based search service to:
   determine that the second search term is in a second language.

19. The system of claim 18, wherein the instructions further cause the index-based search service to:
   apply a third tokenization rule to tokenize the second search term based on the second search term being in the second language.

20. The system of claim 19, wherein to execute the search function includes the tokenized first search term and the tokenized second search term.

* * * * *